(12) United States Patent
Lee et al.

(10) Patent No.: US 8,250,555 B1
(45) Date of Patent: Aug. 21, 2012

(54) COMPILING CODE FOR PARALLEL PROCESSING ARCHITECTURES BASED ON CONTROL FLOW

(75) Inventors: Walter Lee, San Francisco, CA (US);
Robert A. Gottlieb, Westford, MA (US);
Vineet Soni, Union City, CA (US);
Anant Agarwal, Weston, MA (US);
Richard Schooler, Cambridge, MA (US)

(73) Assignee: Tilera Corporation, Westborough, MA (US)

( * ) Notice: Subject to any disclaimer, the term of this patent is extended or adjusted under 35 U.S.C. 154(b) by 1211 days.

(21) Appl. No.: 12/028,002

(22) Filed: Feb. 7, 2008

Related U.S. Application Data

(60) Provisional application No. 60/888,639, filed on Feb. 7, 2007.

(51) Int. Cl.
*G06F 9/44* (2006.01)
*G06F 9/45* (2006.01)
(52) U.S. Cl. ......... 717/159; 717/132; 717/151; 717/161
(58) Field of Classification Search ........................ None
See application file for complete search history.

(56) References Cited

U.S. PATENT DOCUMENTS

| | | | |
|---|---|---|---|
| 5,603,046 A | | 2/1997 | Wiles et al. |
| 5,694,577 A | | 12/1997 | Kiyohara |
| 5,732,273 A | * | 3/1998 | Srivastava et al. ............. 717/132 |
| 5,801,958 A | * | 9/1998 | Dangelo et al. ............... 716/102 |
| 5,896,537 A | * | 4/1999 | Landi et al. .................... 717/132 |
| 5,966,534 A | * | 10/1999 | Cooke et al. ................... 717/159 |
| 6,502,063 B1 | | 12/2002 | Eriksson et al. |
| 6,507,947 B1 | * | 1/2003 | Schreiber et al. ............. 717/159 |
| 6,584,611 B2 | | 6/2003 | Babaian et al. |
| 6,988,183 B1 | | 1/2006 | Wong |

(Continued)

FOREIGN PATENT DOCUMENTS

WO   WO 2004/072796   8/2004

OTHER PUBLICATIONS

Noah Snavely, Unpredication, Unscheduling, Unspeculation: Reverse Engineering Itanium Executables [online], Feb. 2005,[retrieved on Aug. 31, 2011]. Retreived from the internet: <URL:http://www.cs.arizona.edu/solar/papers/tse.itanium.pdf> pp. 99-115.*

(Continued)

*Primary Examiner* — Don Wong
*Assistant Examiner* — Anibal Rivera
(74) *Attorney, Agent, or Firm* — Fish & Richardson P.C.

(57) ABSTRACT

A system comprises a plurality of computation units interconnected by an interconnection network. A method for configuring the system comprises forming subsets of instructions corresponding to different portions of a program, the subsets of instructions being related according to a control flow graph; for each of a first subset of branches in the control flow graph, scheduling a value of an associated branch condition to be broadcast to multiple computation units; for each of a second subset of branches in the control flow graph, representing each instruction dependent on an associated branch condition as a predicated instruction that includes a predicate for computing the associated branch condition; assigning each subset of instructions to one of the computation units for execution on the assigned computation unit; and converting at least some of the predicated instructions in a subset of instructions assigned to a given computation unit into unpredicated instructions that depend on a branch local to the given computation unit.

34 Claims, 12 Drawing Sheets

```
x = B[i]
y = x*i+2
i = i+1
z = x*i+4
```

| 1 | add addr,B,i |
| 2 | ld x, 0(addr) |
| 3 | mul tmp1,x,i |
| 4 | add y,tmp1,2 |
| 5 | add i2,i,1 |
| 6 | mul tmp2,x,i2 |
| 7 | add z,tmp2,4 |

| a | read i |
| b | read B |
| 1 | add addr,B,i |
| 2 | ld x, 0(addr) |
| 3 | mul tmp1,x,i |
| 4 | add y,tmp1,2 |
| 5 | add i2,i,1 |
| 6 | mul tmp2,x,i2 |
| 7 | add z,tmp2,4 |
| c | write y |
| d | write z |
| e | write i,i2 |

U.S. PATENT DOCUMENTS

| | | | |
|---|---|---|---|
| 7,013,353 | B2 | 3/2006 | Parthasarathy et al. |
| 7,047,232 | B1 | 5/2006 | Serrano |
| 7,394,288 | B1 | 7/2008 | Agarwal |
| 7,461,236 | B1 | 12/2008 | Wentzlaff |
| 7,627,864 | B2* | 12/2009 | Du et al. ............... 717/159 |
| 7,673,295 | B1* | 3/2010 | Lin ............... 717/132 |
| 7,689,980 | B2* | 3/2010 | Du et al. ............... 717/159 |
| 7,734,895 | B1 | 6/2010 | Agarwal et al. |
| 7,757,222 | B2* | 7/2010 | Liao et al. ............... 717/159 |
| 7,797,691 | B2 | 9/2010 | Cockx et al. |
| 7,818,725 | B1 | 10/2010 | Agarwal et al. |
| 7,840,914 | B1 | 11/2010 | Agarwal et al. |
| 2002/0019910 | A1 | 2/2002 | Pitsianis et al. |
| 2002/0138710 | A1 | 9/2002 | Sih et al. |
| 2003/0014743 | A1* | 1/2003 | Cooke et al. ............... 717/161 |
| 2003/0120899 | A1 | 6/2003 | Stotzer et al. |
| 2003/0196197 | A1 | 10/2003 | Fu et al. |
| 2003/0200421 | A1 | 10/2003 | Crook et al. |
| 2004/0030859 | A1 | 2/2004 | Doerr et al. |
| 2004/0088526 | A1* | 5/2004 | Colavin et al. ............... 712/226 |
| 2004/0226006 | A1* | 11/2004 | Russell ............... 717/154 |
| 2005/0132344 | A1* | 6/2005 | Vorbach et al. ............... 717/151 |
| 2005/0166205 | A1 | 7/2005 | Oskin et al. |
| 2005/0188364 | A1 | 8/2005 | Cockx et al. |
| 2005/0278714 | A1* | 12/2005 | Vahid et al. ............... 717/159 |
| 2006/0041872 | A1 | 2/2006 | Poznanovic et al. |
| 2006/0101104 | A1 | 5/2006 | Bhanot et al. |
| 2006/0179429 | A1 | 8/2006 | Eggers et al. |
| 2007/0011684 | A1* | 1/2007 | Du et al. ............... 718/105 |
| 2007/0043531 | A1 | 2/2007 | Kosche et al. |
| 2007/0083857 | A1* | 4/2007 | Jiang et al. ............... 717/130 |
| 2007/0089075 | A1* | 4/2007 | Ward ............... 716/4 |
| 2007/0124722 | A1 | 5/2007 | Gschwind |
| 2007/0150706 | A1 | 6/2007 | Crook et al. |
| 2007/0174829 | A1* | 7/2007 | Brockmeyer et al. ......... 717/151 |
| 2007/0198971 | A1 | 8/2007 | Dasu et al. |
| 2007/0219771 | A1 | 9/2007 | Verheyen et al. |
| 2007/0299993 | A1 | 12/2007 | Vorbach et al. |
| 2010/0153654 | A1 | 6/2010 | Vorbach et al. |

OTHER PUBLICATIONS

Hyesoon Kim, Wish Branches: Combining Conditional Branching and Predication for Adaptive Predicated Execution [online], 2005,[retrieved on Aug. 31, 2011]. Retrieved from the internet: <URL:http://hps.ece.utexas.edu/pub/kim_micro05.pdf> pp. 1-12.*

Deming Chen, FPGA Design Automation: A Survey [online], Nov. 2006,[retrieved on Aug. 31, 2011]. Retrieved from the internet: <URL:http://hps.ece.utexas.edu/pub/kim_micro05.pdf> pp. 195-329.*

Jay Bharadwaj, The Intel IA-64 Compiler Code Generator[online], 2000,[retrieved on Aug. 31, 2011]. Retrieved from the internet: <URL:http://www.info.uni-karlsruhe.de/~rubino/ia64p/ieee/Ntel_IA-46-Code-Generator.pdf> pp. 44-53.*

Artur Klauser, Dynamic Hammock Predication for Non-predicated Instruction Set Architectures[online], 1998,[retrieved on Aug. 31, 2011]. Retrieved from the internet: <URL:http://cseweb.ucsd.edu/~calder/abstracts/PACT-98-DP.html> pp. 1-8.*

Roman Kuznar et al., Cost Minimization of Partitions into Multiple Devices, ACM 0-89791-577,1993, [Retrieved on Apr. 18, 2012]. Retrieved from the internet: <URL: http://dl.acm.org/citation.cfm?id=164910> 6 Pages (315-320).*

Stephen Schmitt et al., Verification of a Microcontroller IP Core for Systerm-on-a-Chip Designs Using Low-Cost Prototyping Environments, IEEE 1530-1591/04, 2004, [Retrieved on Apr. 18, 2012]. Retrieved from the internet: <URL:http://ieeexplore.ieee.org/stamp/stamp.jsp?tp=&arnumber=1269213> 6 Pages (1-6).*

Oliver Diessel et al., On Scheduling Dynamic FPGA Reconfigurations, 1998, [Retrieved on Apr. 18, 2012]. Retrieved from the internet: <URL: http://www.cse.unsw.edu.au/~odiessel/papers/phddiessel.pdf> 131 Pages (1-131).*

Agarwal, Anant. "Raw Computation," *Scientific American* vol. 281, No. 2: 44-47, Aug. 1999.

Taylor, Michael Bedford et. al., "Evaluation of the Raw Microprocessor: An Exposed-Wire-Delay Architecture for ILP and Streams," *Proceedings of International Symposium on Computer Architecture*, Jun. 2004.

Taylor, Michael Bedford et. al., "Scalar Operand Networks: On-Chip Interconnect for ILP in Partitioned Architectures," *Proceedings of the International Symposium on High Performance Computer Architecture*, Feb. 2003.

Taylor, Michael Bedford et. al., "A 16-Issue Multiple-Program-Counter Microprocessor with Point-to-Point Scalar Operand Network," *Proceedings of the IEEE International Solid-State Circuits Conference*, Feb. 2003.

Taylor, Michael Bedford et. al., "The Raw Microprocessor: A Computational Fabric for Software Circuits and General-Purpose Programs," *IEEE Micro*, pp. 25-35, Mar.-Apr. 2002.

Lee, Walter et. al., "Space-Time Scheduling of Instruction-Level Parallelism on a Raw Machine," *Proceedings of the Eighth International Conference on Architectural Support for Programming Languages and Operating Systems (ASPLOS-VIII)*, San Jose, CA, Oct. 4-7, 1998.

Kim, Jason Sungtae et al., "Energy Characterization of a Tiled Architecture Processor with On-Chip Networks," *International Symposium on Low Power Electronics and Design*, Seoul, Korea, Aug. 25-27, 2003.

Barua, Rajeev et. al., "Compiler Support for Scalable and Efficient Memory Systems," *IEEE Transactions on Computers*, Nov. 2001.

Waingold, Elliot et al., "Baring it all to Software: Raw Machines," *IEEE Computer*, pp. 86-93, Sep. 1997.

Lee, Walter et. al., "Convergent Scheduling," *Proceedings of the 35th International Symposium on Microarchitecture*, Istanbul, Turkey, Nov. 2002.

Wentzlaff, David and Anant Agarwal, "A Quantitative Comparison of Reconfigurable, Tiled, and Conventional Architectures on Bit-Level Computation," *MIT/LCS Technical Report LCS-TR-944*, Apr. 2004.

Suh, Jinwoo et. al., "A Preformance Analysis of PIM, Stream Processing, and Tiled Processing on Memory-Intensive Signal Processing Kernels," *Proceedings of the International Symposium on Computer Architecture*, Jun. 2003.

Barua, Rajeev et. al., "Maps: A Compiler-Managed Memory System for Raw Machines," *Proceedings of the Twenty-Sixth International Symposium on Computer Architecture (ISCA-26)*, Atlanta, GA, Jun. 1999.

Barua, Rajeev et. al., "Memory Bank Disambiguation using Modulo Unrolling for Raw Machines," *Proceedings of the Fifth International Conference on High Preformance Computing*, Chennai, India, Dec. 17-20, 1998.

Agarwal, A. et. al., "The Raw Compiler Project," *Proceedings of the Second SUIF Compiler Workshop*, Stanford, CA, Aug. 21-23, 1997.

Taylor, Michael Bedford et. al., "Scalar Operand Networks," *IEEE Transactions on Parallel and Distributed Systems (Special Issue on On-Chip Networks)*, Feb. 2005.

Taylor, Michael. The Raw Prototype Design Document V5.01 [online]. Department of Electrical Engineering and Computer Science, Massachusetts Institute of Technology, Sep. 6, 2004 [retrieved on Sep. 25, 2006]. Retrieved from the Internet: <ftp://ftp.cag.les.mit.edu/pub/raw/documents/RawSpec99.pdf>.

Moritz, Csaba Andras et. al., "Hot Pages: Software Caching for Raw Microprocessors," *MIT/LCS Technical Memo LCS-TM-599*, Aug. 1999.

Sanchez Jesus & Antonio Gonzalez, "Clustered Modulo Scheduling in a VLIW Architecture with a Distributed Cache." *Journal of Instruction Level Parallelism*, 3 (2001).

Rau, B. Ramakrishna, "Iterative Modulo Scheduling: An Algorithm for Software Pipelining Loops." Hewlett-Packard Laboratories, 1994.

Sanchez, Jesus & Antonio Gonzalez"Modulo Scheduling for a Fully Distributed Clustered VLIW Architecture." Proceedings of the 33rd Annual ACM/IEEE International Symposium on Microarchitecture. Monterey, California, 2000 (pp. 124-133).

August, David et al. "A Framework for Balancing Control Flow and Prediction." In *1997 MICRO*, Dec. 1997.

Chu, Michael et al. Region-based Hierarchical Operation Partitioning for Multicluster Processors. In *2003 PLDI*, pp. 300-311, 2003.

Cytron, Ron et al. Efficiently Computing Static Single Assignment Form and the Control Dependence Graph. *ACM Transactions on Programming Languages and Systems*, 13(4):451-490, Oct. 1991.

Mahlke, S.A., et al. Effective Compiler Support for Predicated Exection Using the Hyperblock. In *1992 Micro*, pp. 45-54, 1992.

Larsen, Sam et al. "Increasing and Detecting Memory Address Congruence." In 2002 PACT, pp. 18-29, 2002.

Lee, Walter. Thesis: "Software Orchestration of Instruction Level Parallelism on Tiled Processor Architectures." May 2005, 138 pages.

Yang, T. et al. "DSC: Scheduling Parallel Tasks on an Unbounded Number of Processors." *IEEE Transactions on Parallel and Distributed System*, 5(9):951-967, 1994.

Fish & Richardson P.C., Unpublished Patent Application for U.S. Appl. No. 11/433,989, filed May 15, 2006, 45 pages.

Faraboschi, Paolo et al., "Instruction Scheduling for Instruction Level Parallel Processors." Proceedings of the IEEE, vol. 89, No. 11, Nov. 2001, pp. 1638-1659.

Mercaldi, Martha et al., "Instruction Scheduling for a Tiled dataflow Architecture." ASPLOS '06 Oct. 21-25, 2006, 10 pages.

David A. Bader, A Practical Parallel Algorithm for Cycle Detection in Partitioned Digraphs [online], Sep. 21, 1999,[retrieved on Aug. 24, 2011]. Retrieved from the interne: <URL: http://www.cc.gatech.edu/-bader/papers/99013.pdf>. pp. 1-19.

Bradford L. Chamberlain, Graph Partitioning Algorithms for Distributing Workloads of Parallel Computations [online], Oct. 13, 1998,[retrieved on Aug. 24, 2011]. Retrieved from the internet: <URL: http://bluecoat-021?cfru=aHROcDovL 2NpdGVzZ WV yeC5pc3QucHN1LmVkdS 92aWV3ZG9j L2Rv d25sb2Fk P2Rva TOxMC4xLjEuOTcuNTU5MS.

* cited by examiner

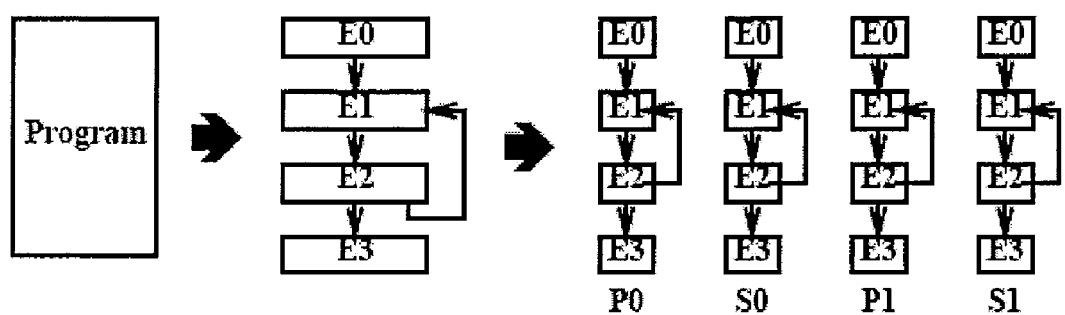
FIG. 3 (a) Compile time
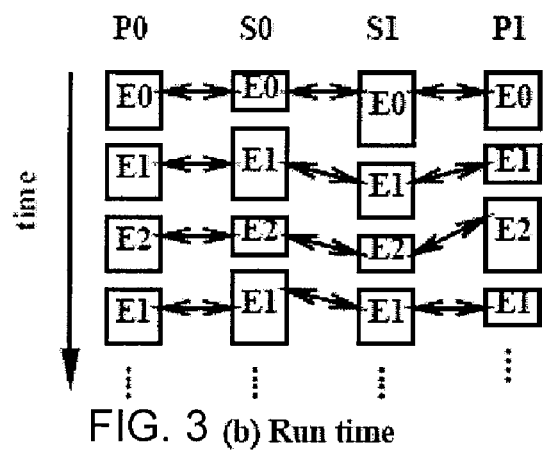
FIG. 3 (b) Run time

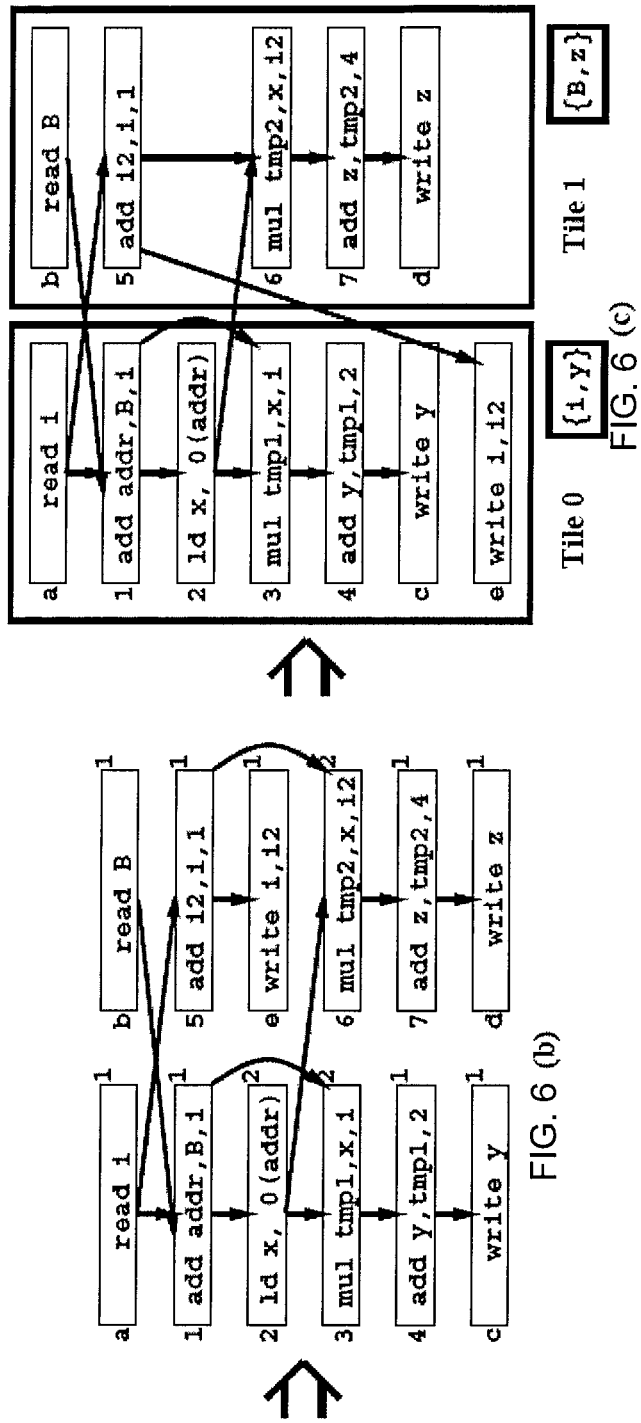

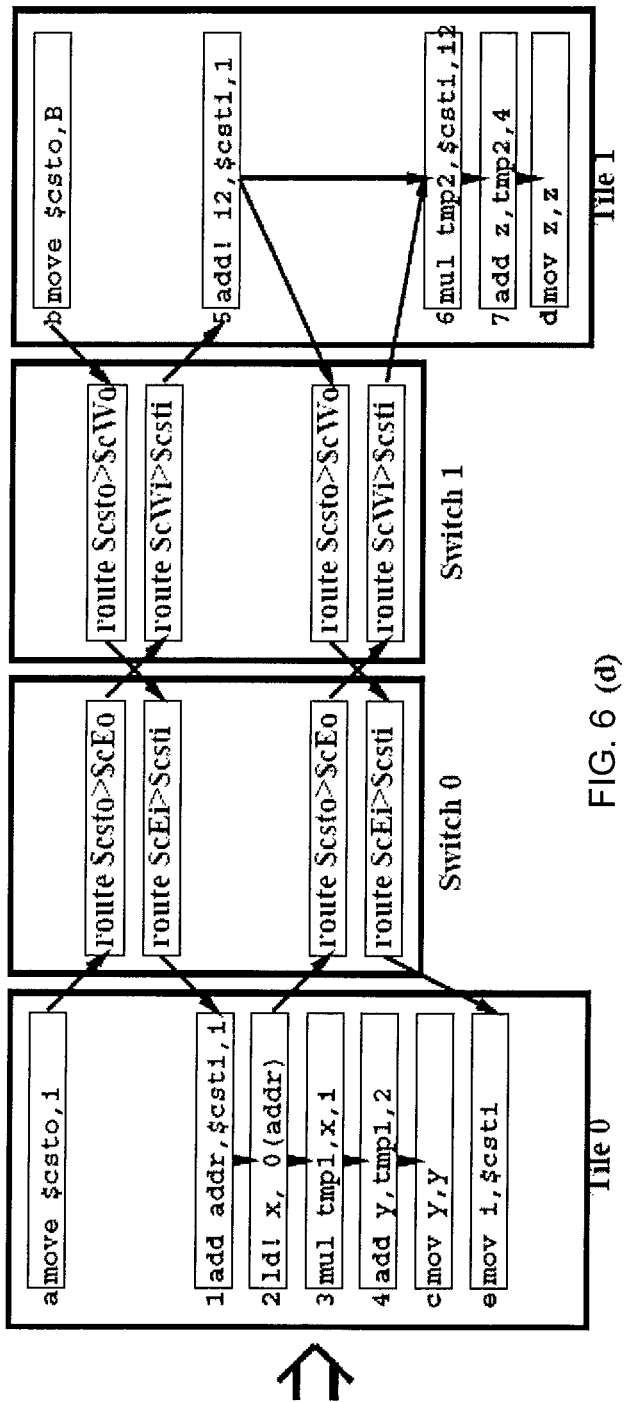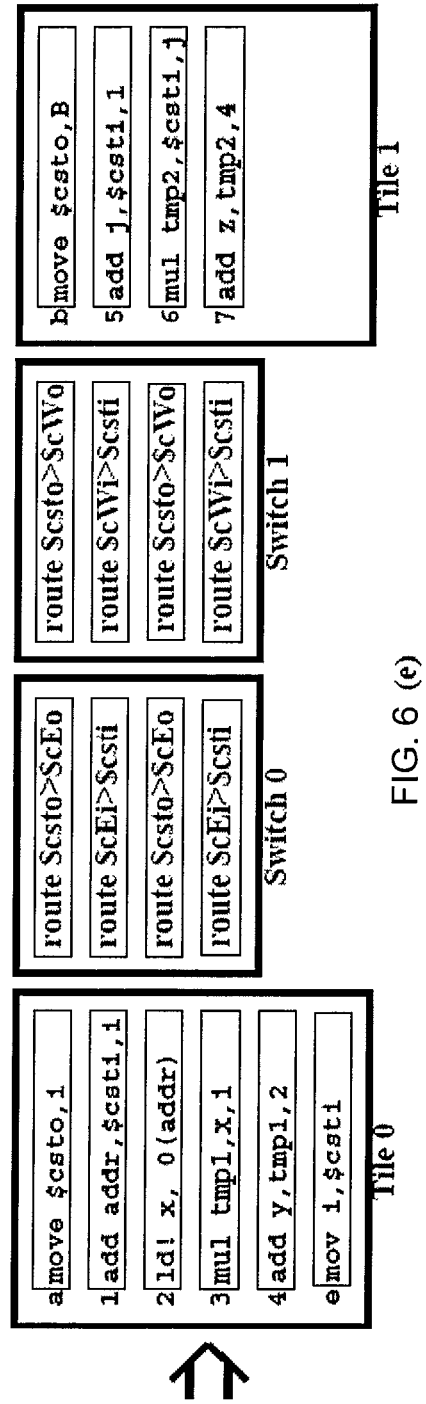
FIG. 6 (d)
FIG. 6 (e)

COMPILING CODE FOR PARALLEL PROCESSING ARCHITECTURES BASED ON CONTROL FLOW

CROSS-REFERENCE TO RELATED APPLICATIONS

This application claims priority to U.S. Application Ser. No. 60/888,639, filed on Feb. 7, 2007.

BACKGROUND

This document relates to compiling code for parallel processing architectures based on control flow.

A multicore processor is a microprocessor with multiple processor cores on a chip. Two trends in silicon technology have made this type of microprocessor increasingly attractive. First, transistor count is continuing to grow exponentially according to Moore's law, with a billion transistors within reach in the next few years. It has become increasingly difficult to come up with new and effective ways to use transistors to improve performance. Stamping out multiple cores is a simple, cost-effective, and efficient way to take advantage of these transistors. Second, long wires are becoming increasingly expensive. Multicore processors are able to control the growth of wires because they naturally keep the length of most of wires to within the length or width of a single core, independent of the total number of cores or transistors on the chip.

A billion-transistor chip with tens or hundreds of cores offers a large potential for performance gain, but actual performance gain will vary for different applications, as will the level of effort required to attain such performance. Except for a few massively parallel, multi-thread applications such as web servers, it is usually a difficult task to parallelize applications to take advantage of multiple cores.

An alternative to parallel programming is to automatically extract parallelism from a single-threaded program and exploit the parallelism on multiple cores. One convenient form of parallelism that can be exploited in this manner is instruction level parallelism (ILP). ILP can readily be found in varying amounts in a typical ordinary, single-threaded program. A compiler that is able to detect such ILP in ordinary programs can exploit it on the multiple functional units of a single-core processor.

SUMMARY

This document describes various techniques, some or all of which apply equally well to a discrete system (not single chip) as well as to single chip systems such as a multicore processor. In a multicore processor, multiple computation units called "processor cores" (or simply "cores") are on one chip. In the description below, the terms "multicore processor" are used interchangeably with terms such as "tiled processor," or a "chip multiprocessor" (CMP), unless otherwise indicated in their context.

In various compiling techniques, a compiler receives one or more programs and generates instructions for execution on multiple cores of a multicore processor based on instruction level parallelism in the one or more programs. The compiler generates a program specification based on the generated instructions to configure the multicore processor or any system that comprises a plurality of computation units interconnected by an interconnection network.

In one aspect, in general, a method for configuring a system, comprising a plurality of computation units interconnected by an interconnection network, comprises: forming subsets of instructions corresponding to different portions of a program, the subsets of instructions being related according to a control flow graph; for each of a first subset of branches in the control flow graph, scheduling a value of an associated branch condition to be broadcast to multiple computation units; for each of a second subset of branches in the control flow graph, representing each instruction dependent on an associated branch condition as a predicated instruction that includes a predicate for computing the associated branch condition; assigning each subset of instructions to one of the computation units for execution on the assigned computation unit; and converting at least some of the predicated instructions in a subset of instructions assigned to a given computation unit into unpredicated instructions that depend on a branch local to the given computation unit.

Aspects can include one or more of the following features.

Converting at least some of the predicated instructions in the subset of instructions assigned to the given computation unit into unpredicated instructions is based on determining a cost of executing predicated instructions.

Converting at least some of the predicated instructions in the subset of instructions assigned to the given computation unit into unpredicated instructions is based on determining that the given computation unit does not support predicated execution.

At least some of the predicated instructions in the subset of instructions assigned to the given computation unit are scheduled as predicated instructions based on determining that the given computation unit supports predicated execution.

At least some of the predicated instructions are scheduled as predicated instructions further based on whether time slots in a schedule are available for executing the predicated instructions.

The given computation unit supports predicated execution using a predicate register that stores a predicate associated with a predicated instruction.

The given computation unit supports predicated execution using conditional move instructions.

The given computation unit supports predicated execution using select instructions.

The predicated instructions converted to the unpredicated instructions are associated with the same predicate, and a branch condition for the branch local to the given computation unit is derived from the predicate.

At least some of the predicated instructions converted to the unpredicated instructions are associated with complementary predicates, and a branch condition for the branch local to the given computation unit is derived from the one of the complementary predicates.

Each subset of instructions has a single entry flow of control and a single exit flow of control.

All internal control flow edges of each subset of instructions are forward edges.

Each branch in the first subset of branches comprises a backward branch, or a forward branch in a given subset of instructions whose target is in a different subset of instructions.

Each branch in the second subset of branches comprises a forward branch in a given subset of instructions whose target is in the given subset of instructions.

The method further comprises forming a specification of the program to be executed by the plurality of computation units based on the assigned subsets of instructions.

In another aspect, in general, a computer program is stored on a computer-readable medium, for configuring a system comprising a plurality of computation units interconnected by an interconnection network. The computer program comprising instructions for causing a computer system to: form subsets of instructions corresponding to different portions of a program, the subsets of instructions being related according to a control flow graph; for each of a first subset of branches in the control flow graph, schedule a value of an associated branch condition to be broadcast to multiple computation units; for each of a second subset of branches in the control flow graph, represent each instruction dependent on an associated branch condition as a predicated instruction that includes a predicate for computing the associated branch condition; assign each subset of instructions to one of the computation units for execution on the assigned computation unit; and convert at least some of the predicated instructions in a subset of instructions assigned to a given computation unit into unpredicated instructions that depend on a branch local to the given computation unit.

In another aspect, in general, a system comprises a plurality of interconnected computation units; and information for configuring the computation units by: forming subsets of instructions corresponding to different portions of a program, the subsets of instructions being related according to a control flow graph; for each of a first subset of branches in the control flow graph, scheduling a value of an associated branch condition to be broadcast to multiple computation units; for each of a second subset of branches in the control flow graph, representing each instruction dependent on an associated branch condition as a predicated instruction that includes a predicate for computing the associated branch condition; assigning each subset of instructions to one of the computation units for execution on the assigned computation unit; and converting at least some of the predicated instructions in a subset of instructions assigned to a given computation unit into unpredicated instructions that depend on a branch local to the given computation unit.

Aspects can include one or more of the following features.

The system further comprises a memory for storing the information for configuring the computation units.

Each computation unit comprises a processor, and a switch including switching circuitry to forward data received over data paths from other computation units to the processor and to switches of other computation units, and to forward data received from the processor to switches of other computation units.

Other features, and advantages of the invention will become apparent from the following description, and from the claims.

DESCRIPTION OF DRAWINGS

FIGS. 3A and 3B are diagrams of an execution model.
FIGS. 6A-6E are diagrams illustrating compiler transformations.

DESCRIPTION

Various compiler techniques including techniques for extracting and exploiting fine-grained parallelism across and within multiple cores in a multicore architecture are described herein. As used herein, exploiting ILP across multiple cores is called Distributed ILP, or DILP.

Not all multicore processors can profitably exploit ILP. A multicore processor whose cores can communicate with very low latency are better able to exploit ILP. A scalar operand network (SON) is the collection of communication mechanisms used to deliver operands between instructions executing on different functional units. Multicore processors that consists of very few cores may be able to use a crossbar or one or more busses for a SON. These interconnects, however, may not scalable if they require long global wires. As the number of cores increases, a pipelined, point-to-point interconnect can be used to keep the wires local while providing the required latency and bandwidth.

Figure 1:
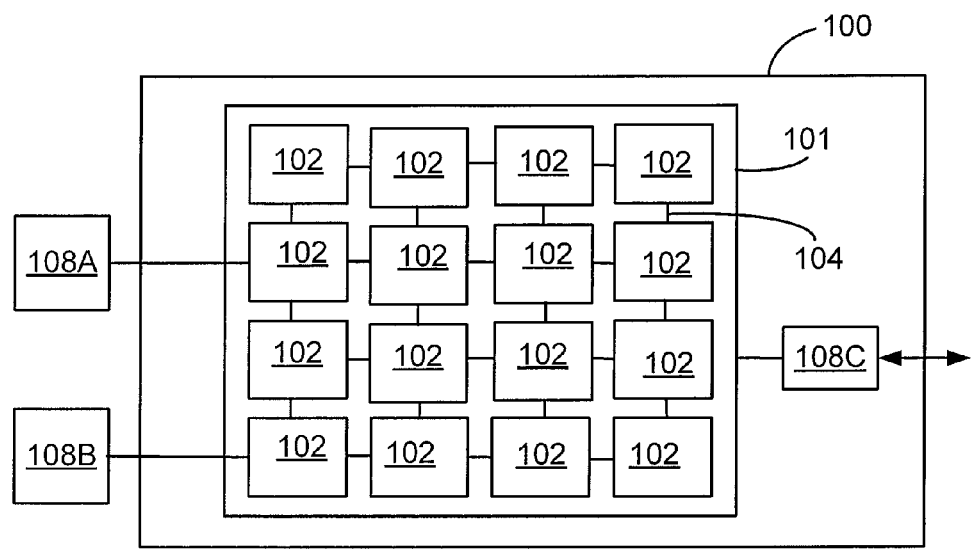
FIG. 1 is a block diagram of a tiled integrated circuit.

An exemplary multicore architecture for which various techniques can be implemented is a tiled architecture illustrated in FIG. 1., in which an integrated circuit 100 (or "chip") includes an array 101 of interconnected tiles 102. Each of the tiles 102 includes a processor (or "processor core") and a switch that forwards data from other tiles to the processor and to switches of other tiles over data paths 104. In each tile, the switch is coupled to the processor so that data can be sent to or received from processors of other tiles over the communication fabric formed by the switches and data paths. The integrated circuit 100 includes other on-chip circuitry such as input/output (I/O) interface circuitry to couple data in and out of the circuit 100, and clock distribution circuitry to provide clock signals to the processors of the tiles.

The example of the integrated circuit 100 shown in FIG. 1 includes a two-dimensional array 101 of rectangular tiles with data paths 104 between neighboring tiles to form a mesh network. The data path 104 between any two tiles can include multiple "wires" (e.g., serial, parallel or fixed serial and parallel signal paths on the integrated circuit 100) to support parallel channels in each direction. Optionally, specific subsets of wires between the tiles can be dedicated to different mesh networks that can operate independently.

In some examples, the network includes paths that extend to diagonal neighbors or to tiles that are multiple rows or columns away. Other examples include higher dimensional mesh topologies. For example, multiple layered integrated circuits or other three-dimensional configurations can be used to form networks in which the connections form a cube of network nodes. In some implementations, a switch coupled to a processor forwards data to and from the processor or between neighboring processors over data paths of a one-dimensional interconnection network such as ring network.

The data paths 104 from one or more tiles at the edge of the network can be coupled out of the array of tiles 101 (e.g., over I/O pins) to an on-chip device 108A, an off-chip device 108B, or a communication channel interface 108C, for example. Multiple wires of one or more parallel channels can be multiplexed down to a fewer number of pins or to a serial channel interface. For example, the wires for one or more channels can be multiplexed onto a high-speed serial link (e.g., SerDes, SPIE4-2, or SPIE5) or a memory controller interface (e.g., a memory controller for DDR, QDR SRAM, or Dynamic RAM). The memory controller can be implemented, for example, off-chip or in logic blocks within a tile or on the periphery of the integrated circuit 100.

The following exemplary implementations are described in the context of tiles that each have the same structure and functionality. Alternatively there can be multiple "tile types" each having different structure and/or functionality. For example, tiles that couple data off of the integrated circuit 100 can include additional circuitry for I/O functions. Tiles are not necessarily arranged in a regular rectilinear array.

Figure 2A:
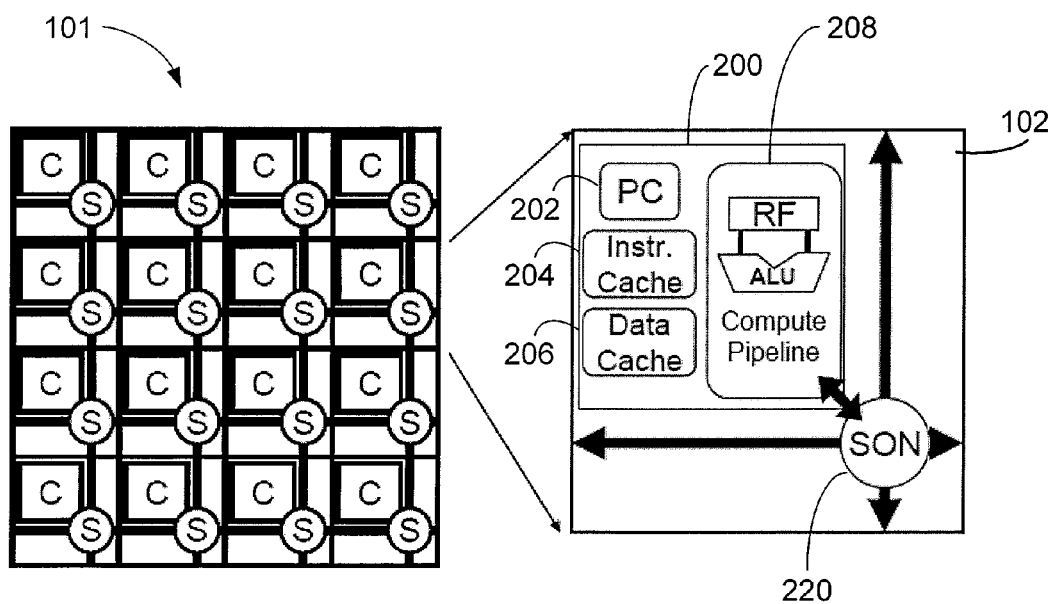
FIG. 2A is a diagram of a tiled processor architecture.

FIG. 2A shows an array of tiles 101 in a tiled multicore architecture that is suitable for exploiting ILP. In this example there are 16 tiles that operate as interconnected processor cores. Each of the tiles includes its own compute processor 200 with at least one program counter 202, an instruction cache memory 204, a data cache memory 206, and compute pipeline 208 Each tile also includes switch 220 coupled to the compute pipeline 208. The switch 220 can include a switch processor. The compute processor 200 can be, for example, a single-issue processor, a VLIW processor, or a superscalar processor. Each tile includes its own instruction cache, fetch unit, program counter, register file, pipeline local bypass paths, and data cache. The caches can optionally be managed as coherent caches, and they are backed by off-chip DRAMs.

A point-to-point SON is directly integrated into the pipeline of the compute processor 200 to provide fast transport of scalar operands between tiles. The SON is register mapped—an instruction sends or receives a value on the SON simply by reading or writing a reserved register. The SON can be programmable by including a static network processor in the network switch 220 that connects its compute processor 200 with the static network processor of the four neighboring tiles. The static network processor has its own instruction stream and is fully programmable. Its instruction set is capable of performing up to five routing operations per cycle. It can also perform branches, jumps, as well as some ALU operations. For DILP compilation, the compiler generates code for not only the compute processors, but the static network processors as well. Latency on the SON is low to provide fast communication of operands between tiles. For example, the latency can be two cycles between neighboring tiles and one extra cycle for each extra unit of Manhattan (horizontal/vertical) distance.

The SON has blocking semantics that provides nearest-neighbor flow control—a processor or switch stalls if it is executing an instruction that attempts to access an empty input port or a full output port. This specification ensures correctness in the presence of timing variations introduced by dynamic events such as cache misses and I/O operations, and it obviates the lock-step synchronization of program counters required by many statically scheduled machines.

Figure 2B:
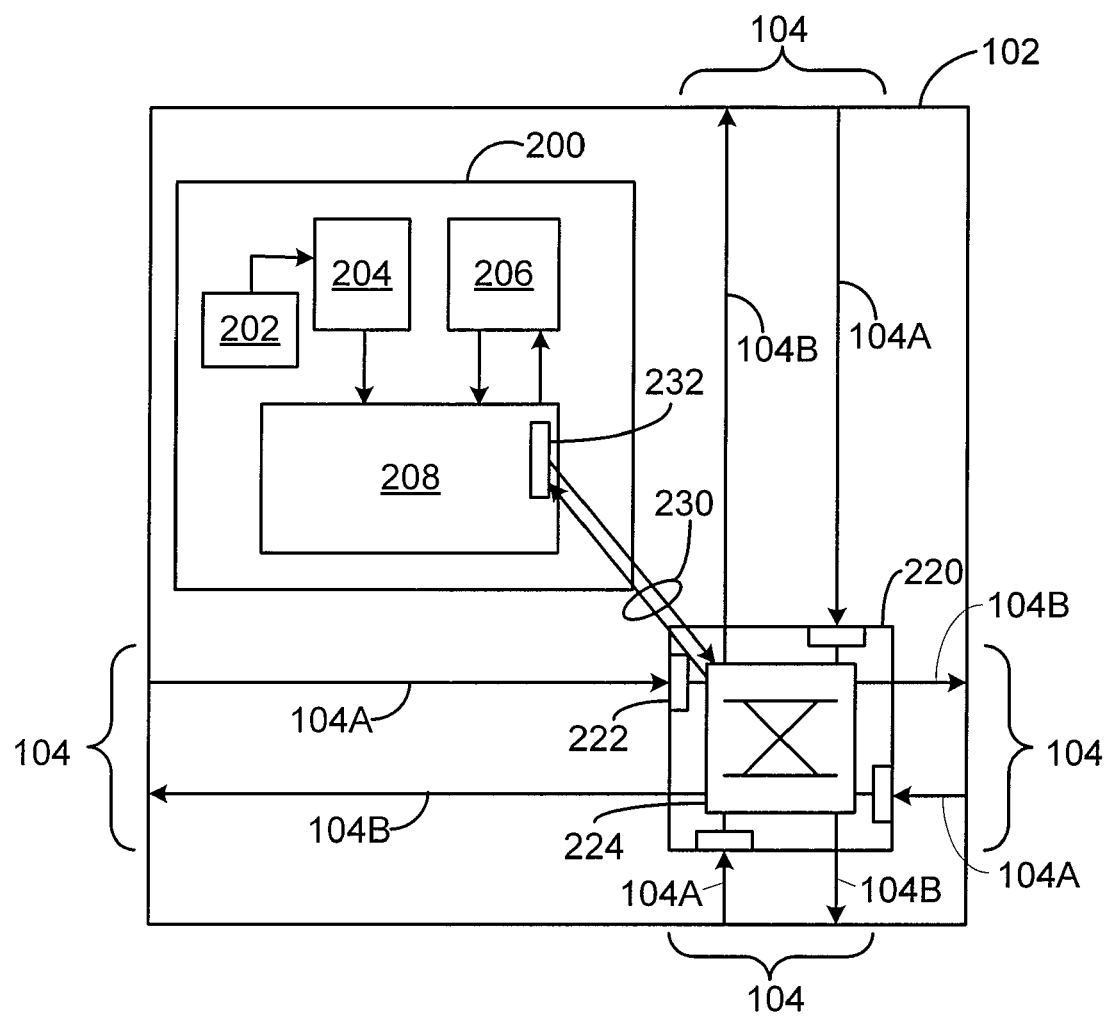
FIG. 2B is a block diagram of a tile.

Referring to FIG. 2B, in a more detailed view, the tile 102 includes a compute processor 200 (or simply "processor 200"), a switch 220, and sets of incoming wires 104A and outgoing wires 104B that form the data paths 104 for communicating with neighboring tiles. The processor 200 includes a program counter 202, an instruction memory 204, a data memory 206, and a pipeline 208. Either or both of the instruction memory 204 and data memory 206 can be configured to operate as a cache for off-chip memory. The processor 200 can use any of a variety of pipelined architectures. The pipeline 208 includes pipeline registers, functional units such as one or more arithmetic logic units (ALUs), and temporary storage such as a register file. The stages in the pipeline 208 include, for example, instruction fetch and decode stages, a register fetch stage, instruction execution stages, and a write-back stage. Whether the pipeline 208 includes a single ALU or multiple ALUs, an ALU can be "split" to perform multiple operations in parallel. For example, if the ALU is a 32-bit ALU it can be split to be used as four 8-bit ALUs or two 16-bit ALUs. The processor 200 can include other types of functional units such as a multiply accumulate unit, or a vector unit.

The processor 200 can be multithreaded and/or have capabilities of a Very Long Instruction Word (VLIW) processor, a superscalar processor, or a vector processor. A VLIW processor can issue multiple instructions based on a stream of macro instructions including subinstructions designated to be executed concurrently by a compiler. A superscalar processor can issue multiple instructions by partitioning one or more instruction stream at run time to multiple functional units. A vector processor can execute instructions using multiple functional units to operate on respective components of data. A multithreaded processor can execute multiple streams of instructions (or threads) within different respective functional units, and/or within a common time-shared functional unit by switching contexts.

In some examples, the processor 200 is a coarse grain multithreaded (CGMT) processor that switches contexts on long latency events such as cache misses to memory or synchronization faults. A multithreaded processor in a tile may also switch contexts when it has to wait on the a network port. In some examples, the processor 200 is a fine grain multithreaded (FGMT) processor that switches contexts every cycle or every few cycles whether there is a long latency event or not. In some examples, the processor 200 is a simultaneous multithreaded (SMT) processor that includes multiple functional units (e.g., in multiple pipelines) to execute instructions from multiple threads without necessarily needing to switch contexts, such as in a superscalar processor.

In some examples, the networks in the tiled array are configured to enable network ports to be shared among multiple threads running in multithreaded processors in the tiles. For example, the networks allow data for different threads to be interleaved such that, if a processor switches context while a first thread is writing to or reading from a network port, the second thread can also write to or read from the network port.

The switch 220 includes input buffers 222 for temporarily storing data arriving over incoming wires 104A, and switching circuitry 224 (e.g., a crossbar fabric) for forwarding data to outgoing wires 104B or the processor 200. The input buffering provides pipelined data channels in which data traverses a path 104 from one tile to a neighboring tile in predetermined number of clock cycles (e.g., a single clock cycle). This pipelined data transport enables the integrated circuit 100 to be scaled to a large number of tiles without needing to limit the clock rate to account for effects due to wire lengths such as propagation delay or capacitance. (Alternatively, the buffering could be at the output of the switching circuitry 224 instead of, or in addition to, the input.)

Continuing to refer to FIG. 2B, a tile 102 controls operation of a switch 220 using either the processor 200, or separate switch processor dedicated to controlling the switching circuitry 224. Separating the control of the processor 200 and the switch 220 allows the processor 200 to take arbitrary data dependent branches without disturbing the routing of independent messages passing through the switch 220.

In some implementations, the switch 220 includes a switch processor that receives a stream of switch instructions for determining which input and output ports of the switching circuitry to connect in any given cycle. For example, the switch instruction includes a segment or "subinstruction" for each output port indicating to which input port it should be connected. In some implementations, the processor 200 receives a stream of compound instructions with a first instruction for execution in the pipeline 208 and a second instruction for controlling the switching circuitry 224.

The switch instructions enable efficient communication among the tiles for communication patterns that are known at compile time. This type of routing is called "static routing."

An example of data that would typically use static routing are operands of an instruction to be executed on a neighboring processor.

The switch 220 also provides a form of routing called "dynamic routing" for communication patterns that are not necessarily known at compile time. In dynamic routing, circuitry in the switch 220 determines which input and output ports to connect based on the data being dynamically routed (for example, in header information). A tile can send a message to any other tile by generating the appropriate address information in the message header. The tiles along the route between the source and destination tiles use a predetermined routing approach (e.g., shortest Manhattan Routing). The number of hops along a route is deterministic but the latency depends on the congestion at each tile along the route. Examples of data traffic that would typically use dynamic routing are memory access traffic (e.g., to handle a cache miss) or interrupt messages.

The dynamic network messages can use fixed length messages, or variable length messages whose length is indicated in the header information. Alternatively, a predetermined tag can indicate the end of a variable length message. Variable length messages reduce fragmentation.

The switch 220 can include dedicated circuitry for implementing each of these static and dynamic routing approaches. For example, each tile has a set of data paths, buffers, and switching circuitry for static routing, forming a "static network" for the tiles; and each tile has a set of data paths, buffers, and switching circuitry for dynamic routing, forming a "dynamic network" for the tiles. In this way, the static and dynamic networks can operate independently. A switch for the static network is called a "static switch"; and a switch for the dynamic network is called a "dynamic switch." There can also be multiple static networks and multiple dynamic networks operating independently. For example, one of the dynamic networks can be reserved as a memory network for handling traffic between tile memories, and to/from on-chip or off-chip memories. Another network may be reserved for data associated with a "supervisory state" in which certain actions or resources area reserved for a supervisor entity.

As described above, the switch 220 is coupled to the processor 200 over processor coupling wires 230. For fast (e.g., low latency) communication between tiles of neighboring processors, the coupling wires 230 can be integrated directly into the pipeline 208. The processor 200 can communicate with the switch 220 using distinct opcodes to distinguish between accesses to the static and dynamic network ports. Alternatively, the instructions can use register names to refer to switch ports.

For example, the processor can send or receive data by writing to or reading from a register interface that is directly mapped to the input buffers 222 of the switch 220. For data going to or coming from the processor 200, a switch instruction indicates that the switch 220 should couple data to or from a selected register or bypass path of the pipeline 208 over a register mapped pipeline integrated switch interface 232. This pipeline integration allows data to be available to the switch 200 the moment an instruction is executed and the register value is available. In the next cycle the same data could appear at an input buffer of another tile.

Some or all of the tiles can include a processor 200 that is configured to process multiple instruction streams and issue multiple instructions in a given cycle. The multiple instruction streams can be derived from a common macro instruction stream such as in a VLIW processor, or can be provided as separate threads. The processor 200 can include multiple logic units that process a corresponding one of the instruction streams, based on a common program counter as in a VLIW processor, or based on separate program counters as in a multithreaded processor. The processor 200 can also include multiple register files each associated with a corresponding one of the instruction streams. These multiple processor instruction streams provide a form of concurrency in which a tile can execute multiple computations in same clock cycle.

The multiple logic units can include, for example, one or more of an arithmetic logic unit, an arithmetic unit, a multiply accumulate unit, a multiply add unit, a vector unit, a load or store unit, or a branch unit. The logic units can also include units that interact with the switch, such as a switch read unit, which reads data received by the switch, or a switch write unit, which stores data that is to be sent over the switch. For example, a switch write unit can include a FIFO buffer or a register.

Figure 2C:
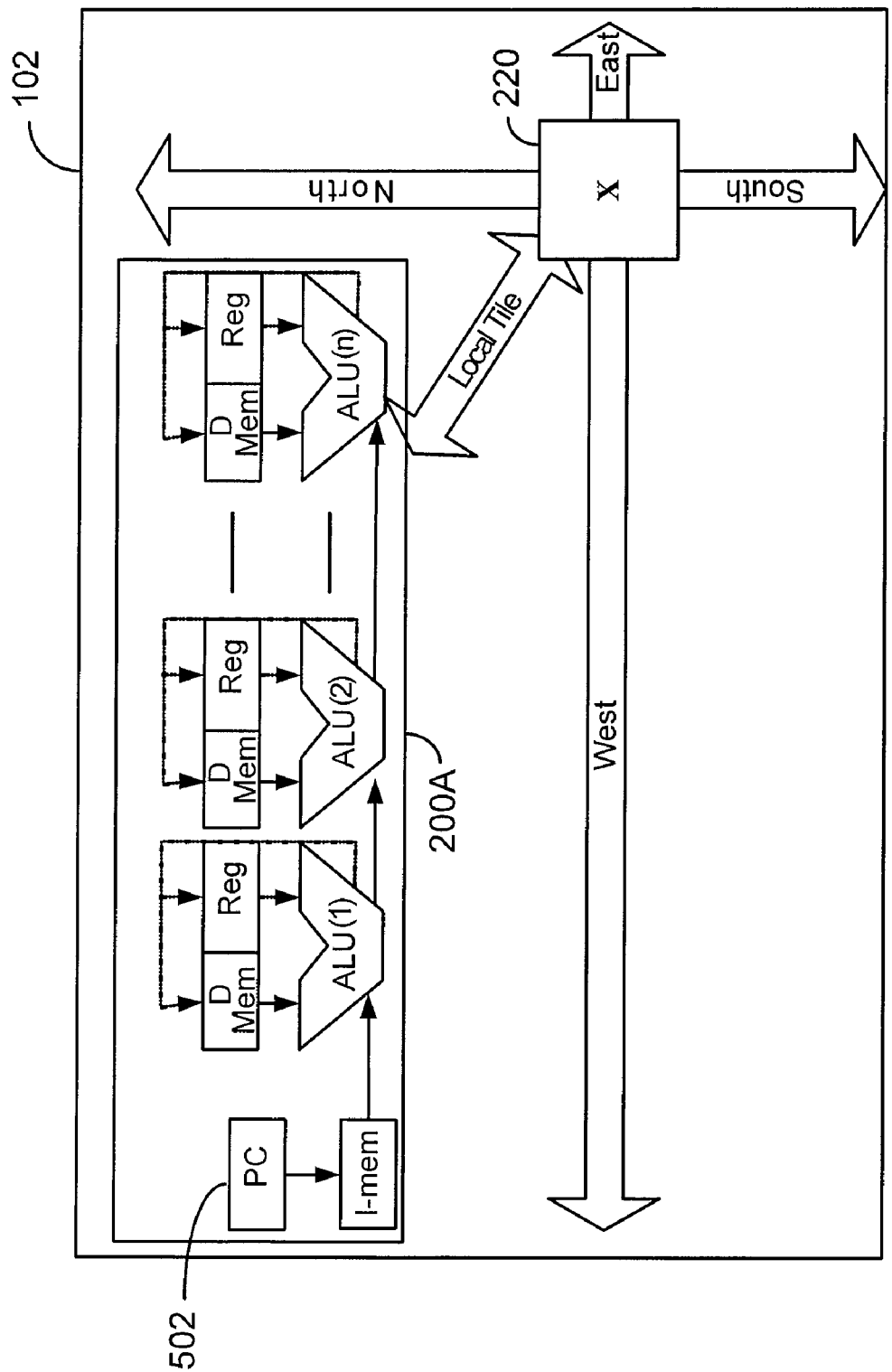
FIG. 2C is a block diagram of a VLIW processor.

In the case of a VLIW processor, the processor 200 is configured to execute instructions taking into account interactions with the switch 220. For example, the subinstructions of a VLIW instruction are executed together; therefore, if some subinstructions are reading from or writing to a port of the switch, the processor may need to stall execution of the VLIW instruction if a subinstruction is temporarily unable to read from or write to a port of the switch. FIG. 2C shows an example of a tile 102 including a VLIW processor 200A having n ALUs (ALU(1)-ALU(n)) that operate based on a common program counter 502.

Figure 2D:
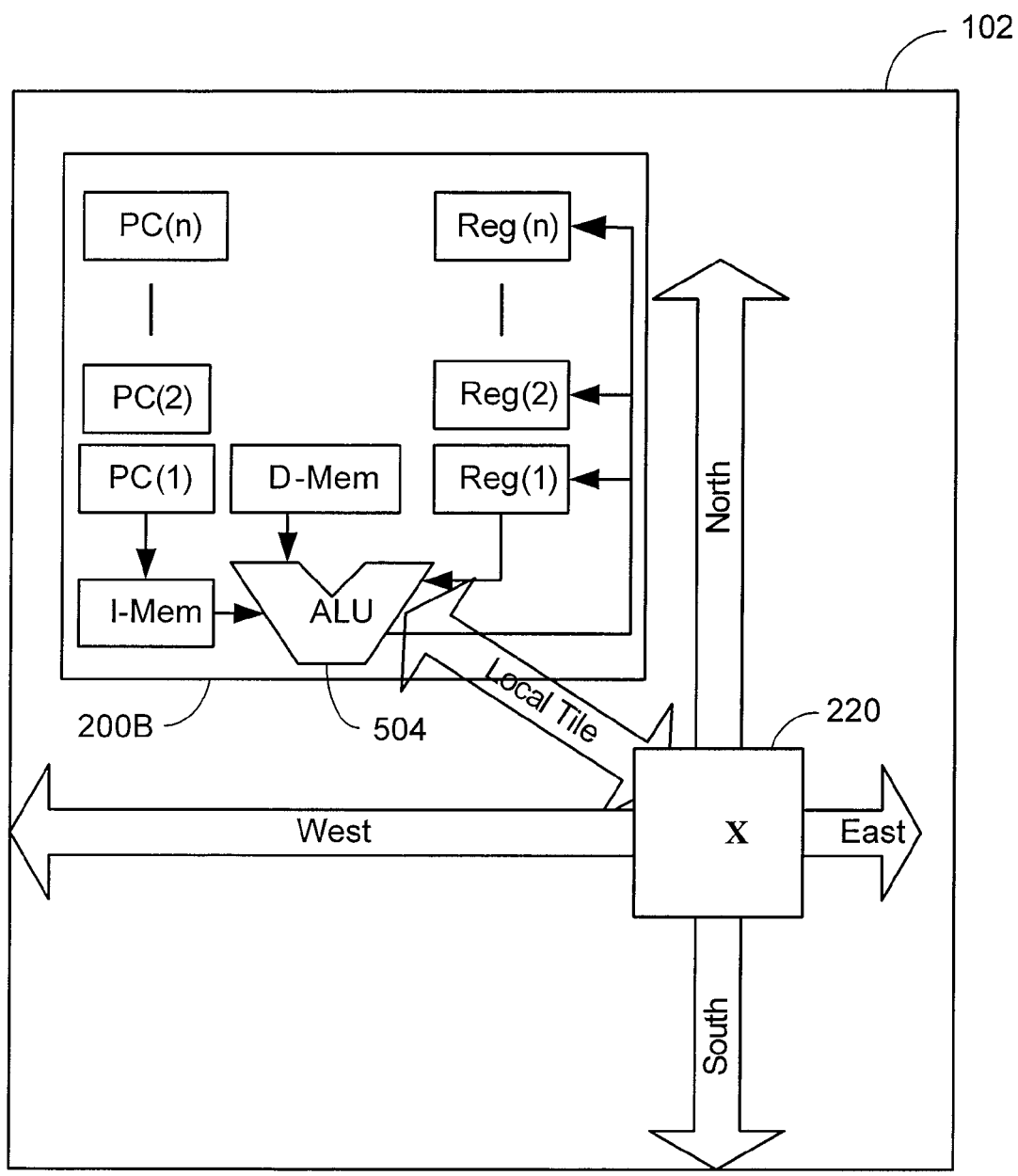
FIG. 2D is a block diagram of a multithreaded processor.

There can be a long latency associated with certain tasks such as accessing memory, sending data across the network, an synchronizing multiple tiles. When one thread of a multithreaded processor is executing an instruction involving one of these tasks, another thread can perform another task so that the latency associated with those tasks are overlapped. FIG. 2D shows an example of a tile 102 including a multithreaded processor 200B having n program counters (PC(1)-PC(n)) and n register files (Reg(1)-Reg(n)) that can be selectively coupled to an ALU 504 so that when one thread is waiting on a long latency event, the processor 200B switch to a new thread in a new context, characterized by a different program counter and register file.

Figure 2E:
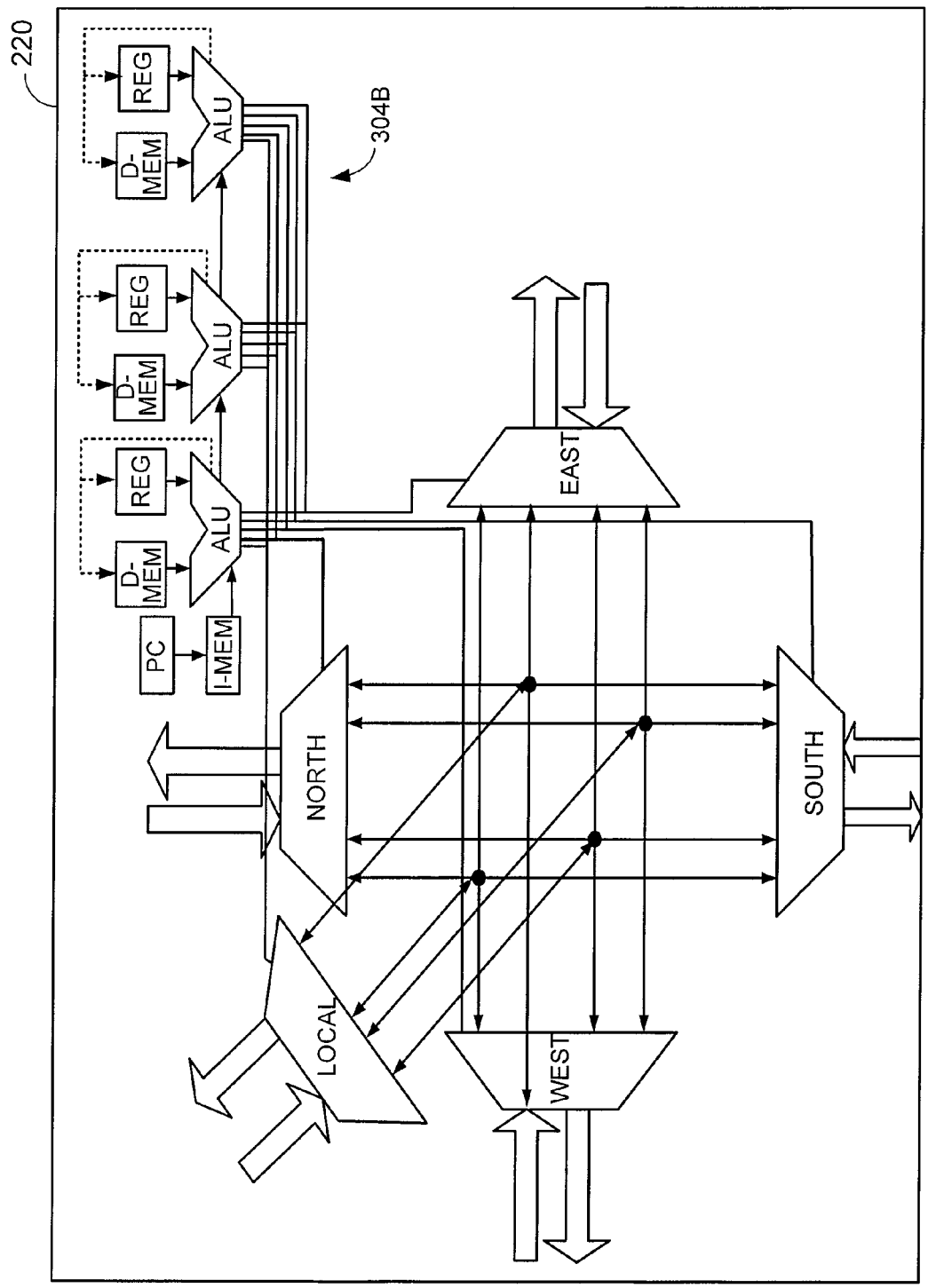
FIG. 2E is a block diagram of a VLIW switch processor.
Figure 2F:
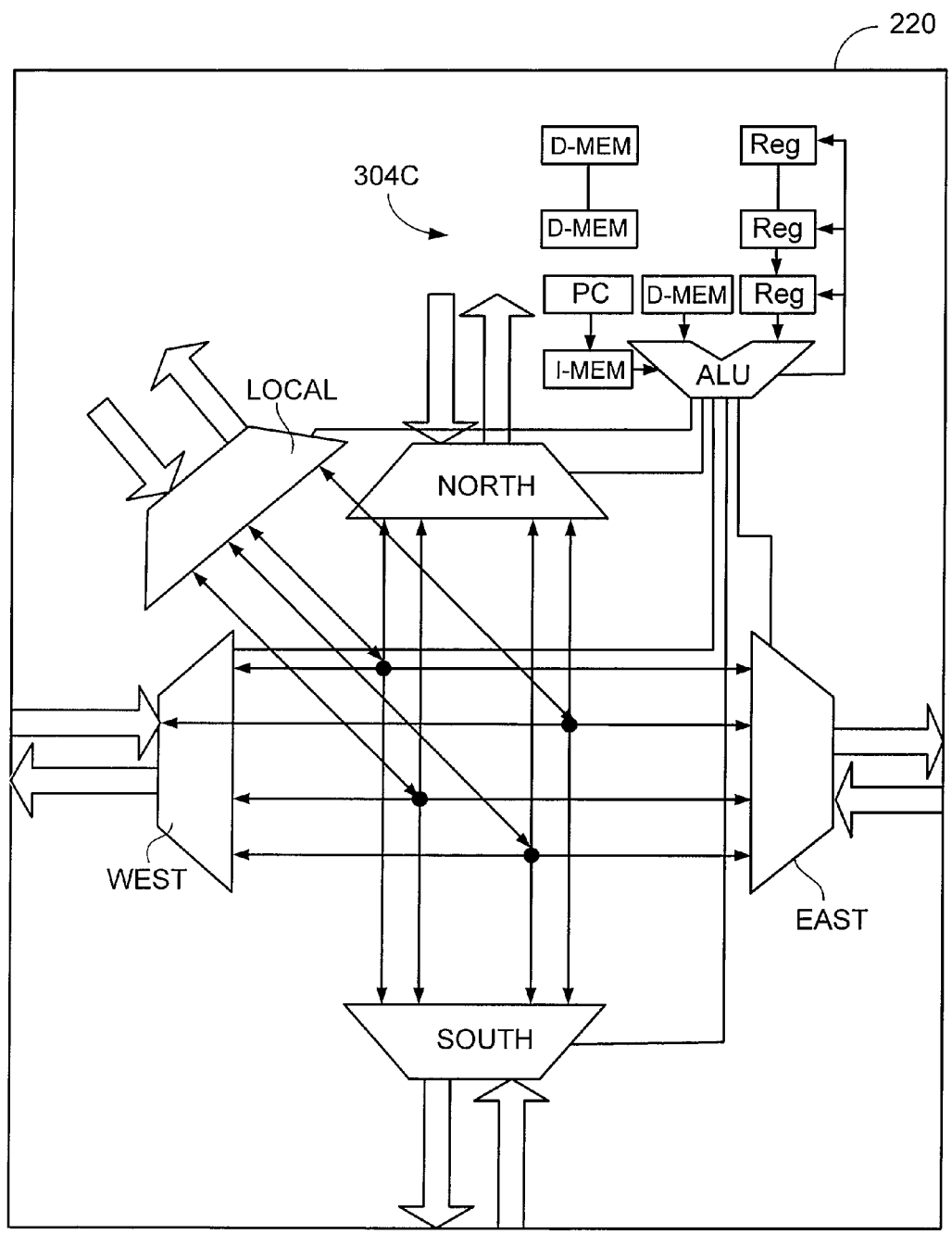
FIG. 2F is a block diagram of a multithreaded switch processor.

A switch processor can also be a VLIW processor 304B or a multithreaded processor 304C, as shown in FIGS. 2E and 2F, respectively.

The tiled architecture is described in more detail in U.S. application Ser. No. 11/404,958, incorporated herein by reference.

Examples described below use the terms "switch" and "static network processor" interchangeably to describe functions of the switch 220, and use the term "processor" to refer to a processor that is able to take advantage of some amount of ILP, such as a VLIW processor 200A or 304B.

FIGS. 3A and 3B depict an exemplary ILP execution model. The basic unit of compiler orchestration and execution is a scheduling region. A scheduling region may be any connected control flow region that does not contain any internal back edges. Here, we focus on a special type of scheduling region, an "extended basic block," which is a connected subgraph of the control flow graph with a single entry point, and whose internal edges are all forward edges. The compiler partitions the input program into a series of extended basic blocks. Each extended basic block is then orchestrated separately by the compiler.

For example, the compiler divides the input program into extended basic blocks (E0, E1, E2, E3). For each block, it orchestrates the parallelism within the block, producing corresponding code sequence that execute on each processor (P0, P1) and switch (S0, S1). For each processor and switch, the code sequences for each extended basic block are stitched back together, with control flow between blocks mirroring that of the original program. At run-time, multiple tiles collectively execute one extended basic block at a time, but in a loosely coordinated fashion. While the machine is performing the computation in an extended basic block in parallel, individual tiles communicate with each other through the SON Thus, for each extended basic block, the compiler emits a collection of instruction sequences, one for the processor and one for the switch of each tile, that encodes the computation and the necessary communication to execute that block. Each of these code sequences is assigned to a specific processor or switch at compile time. This collection of instruction sequences corresponding to one extended basic block is called an "execution unit." For a given processor or switch, its code image for the entire program then consists of the collection of instruction sequences that have been assigned to it, with one such sequence from each execution unit.

When a multicore processor, such as a tiled processor, executes a program, the core resources—the processors, the switches, the registers, and the memories—are pooled to execute one execution unit at a time. In this execution model, there are two types of control flows, those internal to an execution unit and those between execution units. Within a single execution unit, the control flow model provided by a multicore processor is very flexible. A processor core may take branches independently of the other cores to exploit parallelism that originates from different basic blocks, similar to how predicated execution exploits such parallelism in other architectures. Unlike predicated execution, however, a single branch may be used to guard the execution of multiple instructions on a core. Furthermore, one or more processor cores can coordinate to exploit parallelism control-dependent on a branch.

After completing the work in one execution unit, tiles proceed to the next execution unit in a loosely coordinated branching mechanism called "asynchronous global branching." Somewhere within the execution unit, the branch condition for the global branching is generated on one tile and broadcast to the processors and switches of the other tiles through the static network. When a processor or switch finishes its work on that execution unit and has received the branch condition, it can branch to the local target corresponding to the next execution unit without any additional synchronization. Due to this lack of explicit synchronization, it is possible for some tiles to begin executing the next execution unit before all tiles have completed the previous execution unit.

The process of mapping ILP onto multiple cores includes three performance-critical tasks: the distribution of memory across cores, the assignment of instructions to cores, and the scheduling of instructions on each core. Since routing in a tiled multicore processor can be explicitly represented as instructions, scheduling becomes a global scheduling problem. In an end-to-end ILP techinque described herein, the assignment and scheduling tasks can be performed separately. While it is possible to perform both tasks at the same time, in some cases doing them separately yields better performance. Algorithms that perform both tasks at once tend to be greedy in nature. They tend to find and distribute fine-grained parallelism across cores, even if the input code has coarser-grained parallelism available that can be distributed at a lower communication cost. This is particularly true for loop codes, which often have coarser-grained parallelism. Furthermore, a scalable SON may require multiple cycles to communicate operands across cores, making the cost of such a mistake higher than on a clustered VLIW with single-cycle communication.

Various compiling techniques are described herein.

One set of compiling techniques relates to managing control flow. A flexible control flow model for DILP leverages the ability of individual cores to follow independent flow of control and includes architectural predication support. This control flow model, in contrast to the model for control localization described in "Space-Time Scheduling of Instruction-Level Parallelism on a Raw Machine," (appearing in 1998 *ASPLOS*, pages 46-57), incorporated herein by reference, enables native architectural support for predication (or "predicated execution"). Control flow are classified into those between scheduling regions and those within a scheduling region. Between scheduling regions, branches are coordinated globally through asynchronous global branches. Within scheduling regions, branches are converted to predication by forming predicated instructions. After the predicated instructions as assigned, if architectural support for predication exists, a decision is made to either preserve the predicated instructions or convert the predicated instructions to unpredicated instructions that use local branches (e.g., using reverse if-conversion) that only need to execute on a subset of tiles. If no architectural support for predication exists, all the predicated instructions are converted to unpredicated instructions after they are assigned, as described in more detail below. In either case, forming and assigning predicated instructions to tiles provides an efficient way to arrange for certain branch conditions to be distributed (at runtime) to a subset of tiles ("multicasting" branch conditions), even if the predicated instructions are converted to unpredicated instructions controlled by local branches. By contrast, with global branches, the branch condition is broadcast to tiles regardless of whether there are instructions that depend on that branch condition. The number of tiles to execute a branch is based on the amount of available parallelism that are control dependent on the branch. For example, see section 1.3. Another set of compiling techniques relates to the extension and application of single-core scheduling techniques and VLIW assignment/scheduling techniques to extracting and exploiting ILP both within a single VLIW or superscalar core and across multiple cores. For example, see section 1.1. When exploiting ILP both within a core and across multiple core, certain trade-offs are made that do not arise in the context of single-core scheduling or VLIW assignment/scheduling. For example, a metric for measuring load imbalance takes into account the level of parallelism supported within a core. The metric does not penalize an assignment of instructions to cores for which a load associated with a given amount of ILP can be handled by the level of parallelism in a single core (e.g., the width of a VLIW instruction).

An exemplary three-pass technique for performing instruction assignment combines (1) dominant sequence clustering, (2) affinity graph construction, and (3) affinity graph construction refinement. For example, see section 1.1.3.

Affinity graph refinement techniques are extended to handle cores that are VLIWs. The technique includes a metric for the width of each VLIW. The load imbalance of a set of instruction assignments is computed by considering only the instructions assigned in excess of the width on each VLIW for each unit of time (e.g., each cycle). For example, see section 1.1.3.

Another set of compiling techniques relates to generating a deadlock free instruction schedule for DILP processors that use a programmable static network for communicating operands between cores. By modeling buffer resources, including the size and number of buffers and how full the buffers become over a schedule, the schedule can aggressively utilize the buffer resources while still guaranteeing deadlock free processing.

A compiler can use a unifying method for scheduling both computation and communication across multiple cores before and/or after register allocation, in a manner that is guaranteed to be deadlock free. One technique is based on extending a traditional list scheduler to model all the computation as well as communication resources across the cores. For example, before register allocation, to avoid generating a schedule that deadlocks, a communication instruction is only allowed to be scheduled if the output buffers it requires are all available. After register allocation, the output schedule is guaranteed to be deadlock free by preserving the order of communication instructions given by the pre-register-allocation scheduler. For example, see sections 1.1.6-1.1.8.

Another set of compiling techniques relates to the issue of maintaining consistency among memories of multiple cores while exploiting ILP across cores with independent flows of control. A multiple data copy problem, described in more detail below, can be avoided using a technique that depends on whether the native architecture targeted by the compiler provides cache coherence (such that each core is guaranteed to have exclusive ownership of a cache line in its cache that is being modified). Without native cache coherence, the compiler performs a copy-in/copy-out procedure to avoid the multiple data copy problem.

A compiler can use a non-speculative method for managing memory for DILP compilation by using a dedicated memory core. To avoid the multiple data copy problem, the compiler can assign all memory accesses that may potentially aliased to this core. Note that the compiler is allowed to map computation to the dedicated memory core as well. For example, see section 1.1.8.

A compiler can use non-speculative methods for distributing and managing memory for DILP compilation on cores without cache coherence. This can include equivalence class unification and modulo unrolling. For example, see sections 2.2 and 2.3.

A compiler can use non-speculative methods for distributing and managing memory for DILP compilation on cores with cache coherence. This can include the application of equivalence class unification and modulo unrolling. For example, see section 2.4.

A compiler can use copy-in/copy-out of global data to integrate DILP with larger applications. During compilation, the compiler divides a program into memory analysis regions. Before an analysis region, global data that will be accessed in that region in a distributed manner is copied from the global structures into some local structures. After the analysis region, such data is copied out from the local structure back into the global structures. For example, see section 2.3.

A compiler can solve the multiple data copy problem via copy-in/copy-out. Combined with a barrier between memory access regions, this eliminates any coherence issues or cache alignment issues with the distributed accesses between different analysis regions. For example, see section 2.3.

A compiler can solve the multiple data copy problem via cache coherence. Combined with a barrier between memory access regions, this eliminates any coherence issues or cache alignment issues with the distributed accesses between different analysis regions. For example, see section 2.4.

1 Compiling Techniques

The following are examples of compiling techniques that can be used to exploit ILP in a multicore architecture.

1.1 ILP Orchestration

Figure 4:
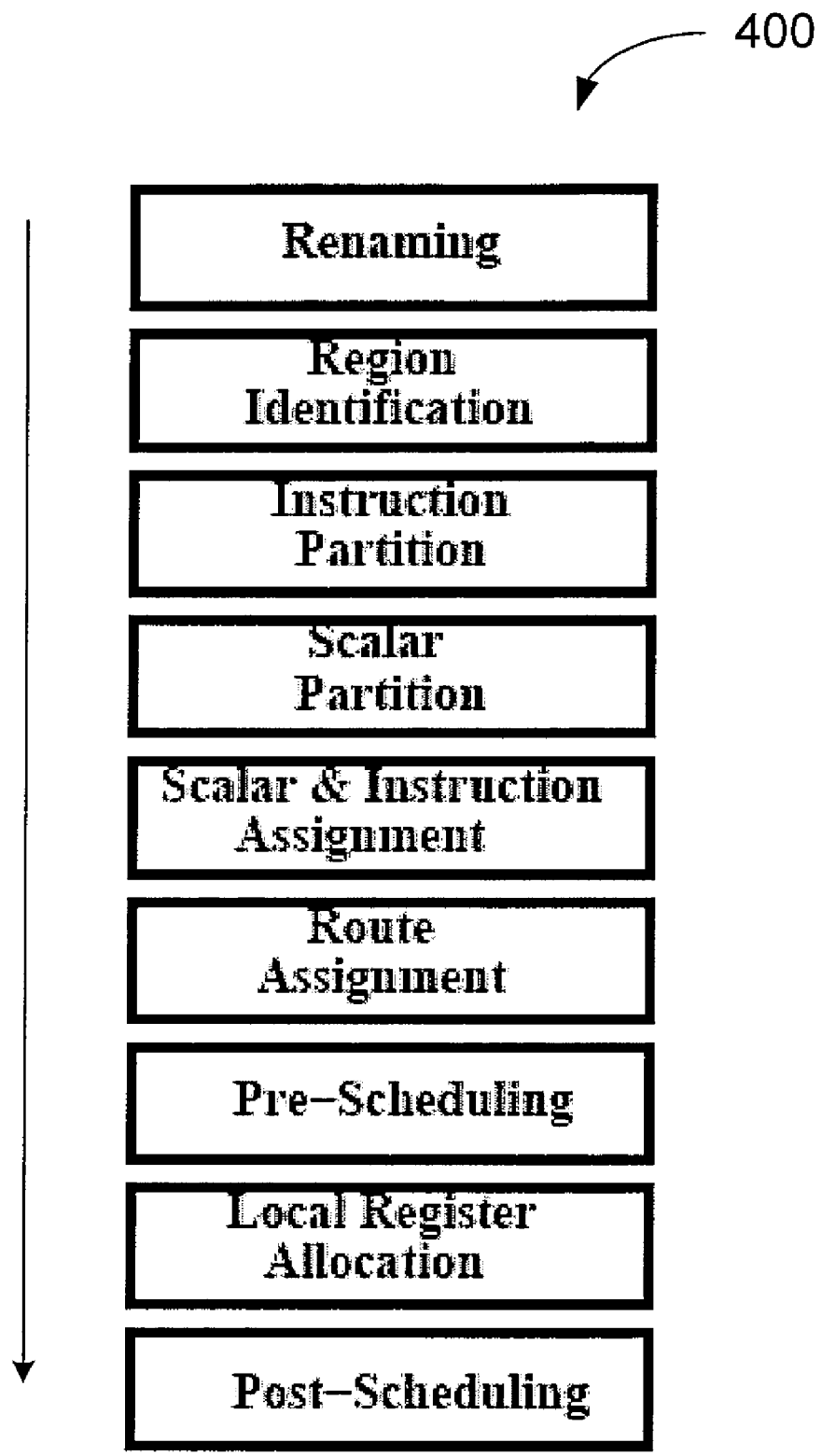
FIG. 4 is a flowchart for a compiler.

FIG. 4 shows an exemplary compiler flow 400 of CC-DILP, the DILP orchestrating compiler. CC-DILP begins by unrolling loops and performing single static assignment (SSA) renaming on a procedure body. Renaming exposes available parallelism by removing anti and output dependences. Then, CC-DILP partitions a procedure body into scheduling regions, which become the units of compilation within which the compiler orchestrates parallelism. The next four phases focus on spatial aspects of the orchestration, as it assigns instructions, scalars, and communication routes to cores. After assignment, CC-DILP performs a single coordinated scheduling pass that schedules computation on each of the cores as well as communication on the switches. After scheduling, CC-DILP applies a register allocator to the code on each core, followed by a phase of post-allocation scheduling.

The components of CC-DILP operate at one of two levels. Renaming, region identification, and the scalar partitioning/ assignment phases operate on an entire procedure at a time. The rest of the phases, which deal primarily with management of instructions, operate on a region at a time. Logically, each of these phases iterate through all the regions in a procedure before proceeding to the next phase.

Each of the phases is described in more details below. To facilitate the explanation, FIGS. 6A-6E show the transformations performed by CC-DILP on a sample piece of code.

1.1.1 Renaming

Figure 5:
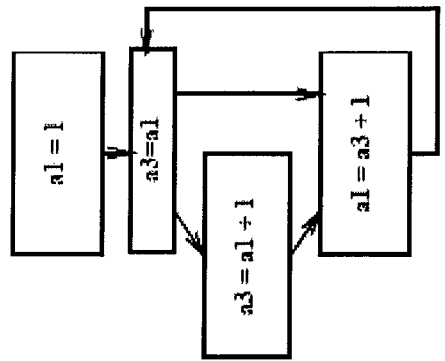
FIGS. 5A-5D are graphs illustrating SSA renaming.
Figure 5:
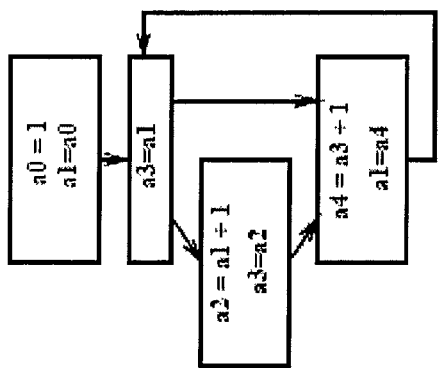
Figure 5:
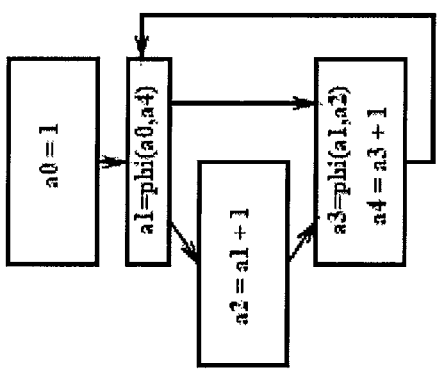
Figure 5:
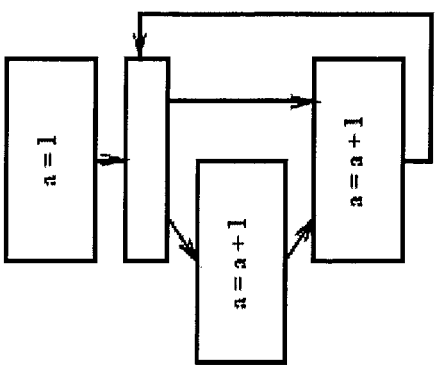

CC-DILP begins by converting the procedure representation to single static assignment (SSA) form. SSA form is an intermediate format for dataflow analysis; it is used here because it is a good representation of parallelism. FIGS. 5A-5D show a sample program being converted to SSA form, as an example of SSA renaming. FIG. 5A shows the initial code in its control flow graph. FIG. 5B shows the renamed SSA form. FIG. 5C shows the result after phi nodes have been converted to copy statements. FIG. 5D shows the final code after the copy statements have been coalesced.

In SSA form, every variable is defined exactly once. A program is converted to SSA form by renaming multiply-defined variables so that each definition gets a unique variable name. The renaming removes anti-dependences (where a value read by one instruction is written by a later instruction, there is an anti-dependence between the instructions) and output-dependences (where a value written by one instruction is also written by a later instruction, there is an output-dependence between the instructions) and exposes all the natural ILP that is contained in the program.

At join points in the control flow graph, a variable in pre-SSA form may have multiple reaching definitions. SSA form represents this situation by the use of phi nodes. A phi node is a like a select operator, where the output variable takes on the value of one of the input variables. Here, the output variable is a fresh renamed variable, while each input variable corresponds to a reaching definition at that program point.

Phi nodes are not executed in hardware. CC-DILP actually converts them into copy statements. A phi node is split into multiple copy statements, one per input variable. Each copy statement is then placed below the corresponding reaching definition. When possible, a copy statement is merged with its reaching definition.

1.1.2 Region Identification

The region identification phase partitions each procedure into distinct scheduling regions. Each scheduling region is a single-entry, single-exit portion of the control flow graph containing only forward control flow edges, such as those generated by if-then-else constructs. Within each scheduling region, if-conversion is applied to convert the code to predicated form. Most subsequent phases of CC-DILP are then applied to each scheduling region separately.

Persistent scalars are scalars that are live on exit out of a basic block. To prepare for the communication of persistent scalars between regions, two types of dummy instructions are inserted. Read instructions are inserted at the beginning of the code sequence for any persistent scalars that are accessed. Write instructions are inserted at the end of the code sequence for any persistent scalars that are written. These instructions simplify the eventual representation of stitch code, the communication needed to transfer values between scheduling regions. This representation in turn allows the event scheduler to overlap the stitch code with other work in the scheduling region. Dummy instructions that are not involved in inter-core communication are eliminated later in the compiler.

FIGS. 6A-6E show an example of the program transformations performed by CC-DILP on a single region. In the data dependence graph for a region, a node represents an instruction, and an edge represents a true data dependence between two instructions (where the output of one instruction is required as input to another instruction). Each node is labeled with the execution time of the instruction. FIG. 6A shows the initial program undergoing transformations made by renaming and region identification. Region identification helps manage the control resource on the tiled processor by performing control selection. See Section 1.3 for more details.

This graph representation is also used for the rest of the example, as described in more detail below. FIG. 6B shows the data dependence graph corresponding to the final code sequence in FIG. 6A; FIG. 6C shows the result after instruction partition, scalar partition, and scalar and instruction assignment, FIG. 6D shows the result of route assignment; FIG. 6E shows the result after pre-scheduling. The results of register allocation and post-scheduling are omitted.

1.1.3 Instruction Assignment

Generally, instruction assignment manages the tradeoff between communication and parallelism. To exploit parallelism across cores, one must incur some communication cost. When distributing the parallelism, the compiler makes sure that the parallelism is profitable in spite of the communication cost.

Here are some basic features of an exemplary algorithm:

1. The algorithm is able to identify and distribute coarser-grained parallelism in favor of fine-grained parallelism.

2. When distributing parallelism, the algorithm has a framework for evaluating the cost/benefit of that distribution. One way to evaluate the benefit is to consider the schedule length both with and without the distribution. But this involves two passes of scheduling for each decision, which may be too expensive. Instead, the compiler can use two metrics that are cheaper to compute on the fly: affinity and load imbalance. The affinity between two groups of instructions is defined to be the number of true data dependences between them. The load imbalance between two group of instructions is a measure of the difference between demand on computational and storage resources of cores that will be executing the instructions. Typically, for some architectures, computational resources of a core tend to be a more limited resource than storage resources. In some architectures, estimated use of storage resources, such as "register pressure" characterizing usage of registers, is also included in the load imbalance metric. Register pressure can be estimated before register allocation by keeping track of the number of values that need to be stored by instructions. Load imbalance can be computed, for example, using a similar time sensitive metric as described in "Region-based Hierarchical Operation Partitioning for Multicluster Processors," (appearing in 2003 *PLDI*, pages 300-311), incorporated herein by reference, except that for each cycle, only the load in excess of the available machine resource contributes to the overall imbalance.

For example, the cited paper describes "cluster weights" as a metric for the load per cluster of instructions. In order to calculate the weight of a particular cluster, a weight for each execution cycle of a region is computed. Two factors in regards to the load of operations on a cluster are: the individual resource constraints for the operations at each cycle, and the total node weight which is the constraint on the shared resources of a given cluster. The individual resource constraint is the load put on any one specific resource. The shared resource weight is the load put on all the resources within the cluster as a whole. Since these individual resource and shared resource weights are competing with one another, the overall cluster weight is the max between them.

The basic approach of the algorithm is as follows. The compiler starts with an initial partition that tries to maximize affinity, then refines the partition to improve load balance. To impose a structure on the refinement process and avoid exponential search, the compiler constructs a hierarchical view of the graph so that groups of instructions that have high affinity are bounded at the lower levels of the graph. When the compiler performs load balance refinement the compiler visits the hierarchy top-down, so that low affinity clusters are considered for refinement first. The refinement process, in this example, makes a single top-down pass through this graph and looks for clusters to move that will improve the quality of the graph, using a metric that accounts for both affinity and load balance.

The algorithm uses a fixed cost for communication latency. Experience shows that even for up to four and eight cores, one of the most important decisions is how many operands are remote; the variable communication latency is a third-order effect.

The following is a more detailed overview of the algorithm. The algorithm includes three phases:

1. Dominant Sequence Clustering (DSC):

DSC is an algorithm that tries to find the best clustering of instructions, assuming a constant communication cost and infinitely many cores. For example, more detail on DSC can be found in "DSC: Scheduling Parallel Tasks on an Unbounded Number of Processors," (appearing in *IEEE Transactions on Parallel and Distributed Systems*, Vol. 5, No. 9, pages 951-967), incorporated herein by reference. Here the algorithm sets the communication cost to the cost between neighboring cycles (two cycles), and uses the resulting clusters to represent units of parallelism. In the final output of the algorithm, DSC clusters are guaranteed to be mapped to the same core.

2. Build an Affinity Graph, Taking the Clusters from DSC as Input:

DSC usually produces more clusters than there are number of cores. The next two phases reduce the number of clusters to at most the number of cores. An affinity graph is a tree that characterizes the affinity between clusters. In the graph, each leaf node is a DSC cluster. Each non-leaf node represents a cluster that consists of all the instructions of its child nodes. The graph is constructed in rough order of affinity, so that clusters with high affinity are toward the leaves of the graph, while clusters with low affinity are toward the root of the graph. The affinity graph will have N roots, where N is the number of cores.

3. Refine the Affinity Graph into the Final Assignments:

The final phase of the algorithm refines the affinity graph into the final assignments. As the starting point, it uses the roots of the affinity graph to represent the assignment, so instructions with the same root gets assigned to the same core. The algorithm then visits each node of the graph from roots to leaves. For each node visited, it examines whether it is profitable to move that node into the current smallest cluster. The cost function considers both affinity and load balance, and roughly treats each unit of affinity to have the same value as a unit of load balance. The width of the machine indicating the number of instructions issued per cycle by a each processor core (e.g., the number of sub-instructions in a VLIW instruction or number of functional units in a superscalar processor core) is integrated into the cost function so that if a load is below the width of the machine, it is not penalized for load imbalance.

This exemplary algorithm considers moves, not swaps. Moves are easier to consider than swaps because the algorithm only needs to target one cluster, not two (N vs $N^2$). This is one advantage of starting initially with an imbalanced but low-affinity groupings and then improving the imbalance with the refinement.

1.1.4 Scalar Partition

The scalar and instruction assignment phase assigns sets of persistent scalars and instruction clusters to physical cores. Recall that dummy copies have been inserted into the Intermediate Representation to represent accesses of persistent scalars. For each persistent scalar, CC-DILP maps all its dummy copies to a consistent core. In this exemplary algorithm, CC-DILP respects the first assignment given to such dummy copies. This assignment is fed into subsequent scheduling regions so that the assignment algorithm can account for them.

FIG. 6C shows a sample output of this phase.

1.1.5 Route Assignment

The route assignment phase translates each non-local edge (an edge whose source and destination nodes are mapped to different cores) in the data dependence graph into a set of communication instructions that route the necessary data value from the source core to the destination core. FIG. 6D shows an example of such a transformation. Communication instructions include send and receive operations on the processors as well as route instructions on the switches. New nodes are inserted into the graph to represent the communication instructions, and the edges of the source and destination nodes are updated to reflect the new dependence relations arising from insertion of the communication nodes. These dependence relations are later enforced during scheduling to ensure a correct ordering of communication events. Note that the instruction set architecture (ISA) for the tiled processor allows send and receive operations to be merged with existing ALU operations, as shown by instructions 2 and 6 in FIG. 6D (the ! after the ld is an implicit send). To reduce the volume of communication, edges with the same source can be serviced jointly by a single multicast operation, though this optimization is not illustrated in the example. Route assignment can be performed via dimension-ordered routing.

1.1.6 Pre-Allocation Scheduling

The scheduler schedules the computation and communication events within a scheduling region with the goal of producing the minimal estimated run-time. Because routing on the tiled processor is itself specified with explicit switch instructions, all events to be scheduled are instructions. Therefore, the scheduling problem can be expressed as a generalization of an instruction scheduling problem.

The job of scheduling communication instructions carries with it the responsibility of ensuring the absence of deadlocks in the network. CC-DILP generates a deadlock-free schedule by treating network buffers as scheduling resources, and by only scheduling an instruction if any buffers it requires are available. This guarantees that the schedule produced by the compiler is deadlock-free. However, the schedule generated should remain deadlock-free and correct even in the presence of dynamic events such as cache misses. The tiled processor architecture uses the static ordering property, implemented through nearest-neighbor flow control, to ensure this behavior. The static ordering property states that if a schedule does not deadlock, then any schedule with the same order of communication events will not deadlock. Because dynamic events like cache misses only add extra latency but do not change the order of communication events and use separate buffers from the static network, they do not affect the correctness of the schedule.

The static ordering property also allows the schedule to be stored as compact instruction streams. Timing information need not be preserved in the instruction stream to ensure correctness, thus obviating the need to insert no-op instructions. FIG. 6E shows a sample output of the event scheduler. Note that the dummy read and write instructions only turn into explicit instructions if they are involved in communication. Also, on the switches, the route instructions that correspond to different paths are freely interleaved without compromising the static ordering property.

The scheduling algorithm is implemented, for example, using a cycle-driven forward list scheduler. Before scheduling, CC-DILP applies reverse if-conversion to the code on each core to convert the predicated code back to branch code (See section 1.3). Then, CC-DILP schedules computation instructions as well as communication instructions in a single pass. The algorithm visits nodes in topological order and keeps track of the current cycle to be scheduled as well as a ready list of instructions, which contains instructions whose predecessors have all been scheduled. As long as the list is not empty, the algorithm goes through the list of ready instructions according to a priority function. For each instruction, it checks to see if the resource required to schedule that instruction is available. Resources modeled include issue resources, functional units, communication ports, as well as communication buffers. If such an instruction is found, the scheduler schedules the instruction, reserves the required resources, and updates the ready list by checking the status of the children of the scheduled instruction. If no such instruction is found, the current cycle is incremented. This process repeats until the ready list is empty and all instructions are scheduled.

The priority function used to decide the order in which instructions are visited is based on the following observation. The priority of a task should be directly proportional to the impact it has on the completion time of the program. This impact, in turn, is bounded from below by two properties of the task: its level, defined to be its critical path length to an exit node; and its average fertility, defined to be the number of descendant nodes divided by the number of cores. Therefore, one definition of the priority of a task is a weighted sum of these two properties.

1.1.7 Register Allocation

The final phase of CC-DILP is register allocation. CC-DILP treats this problem as multiple independent instantiations of the analogous problem on a traditional RISC machine. For example, CC-DILP applies a graph-coloring based register allocator to the code of each core.

1.1.8 Post-Allocation Scheduling

After register allocation, CC-DILP performs a final scheduling pass to account for spills of values stored in allocated registers to memory to make room for other values (e.g., when there are more values than available registers). The algorithm is similar to pre-allocation scheduling. However, the register allocator may have created extra anti-dependences and output-dependences on the schedule that could cause the scheduler to deadlock if communication instructions are allowed to be reordered. Therefore, the order among communication instructions scheduled by the pre-allocation scheduler is preserved. For example, dependence edges are inserted between communication instructions on each processor and switch to ensure that they are scheduled in the same order as the pre-allocation scheduler.

A communication instruction includes any instruction that accesses a network port (or a register mapped to a network port). Thus, communication instructions include any send or receive instruction on the compute processor, or a route instruction on the switch processor. When creating the data dependence graph for scheduling, the compiler creates all the dependence edges that are normally created for a data dependence graph, and also adds dependence edges between communication instructions. For example, for each main processor and each switch processor, from the associated lists of communication instructions, a dependence edge is created between successive instructions on each list.

1.2 The Static Ordering Property

Dynamic events such as cache misses prevent one from statically analyzing the precise timing of a schedule. The compiler can rely on the static ordering property of the tiled processor to generate correct code in the presence of these dynamic events. The static ordering property states that the result produced by a static schedule is independent of the specific timing of the execution. Moreover, it states that whether a schedule deadlocks is a timing-independent property as well. Either the schedule always deadlocks, or it never does.

To generate a correct instruction schedule, the compiler orders the instructions in a way that obeys the instruction dependencies of the program. In addition, it ensures that the schedule is deadlock-free assuming one set of instruction timings. The static ordering property then ensures that the schedule is deadlock-free and correct for any execution of the schedule.

Without intending to be bound by theory, this section provides an informal proof of the static ordering property. The proof restricts the static ordering property to the practical case: given a schedule that is deadlock-free for one set of instruction timings, then for any set of instruction timings:

1. it is deadlock-free; and
2. it generates the same results.

First, we show (1). A deadlock occurs when at least one instruction stream on either the processor or the switch has unexecuted instructions, but no instruction stream can make progress. A non-empty instruction stream, in turn, can fail to make progress if it is attempting to execute a blocked communication instruction. A communication instruction blocks when either its input port is empty, or its output port is full. Computation instructions do not use communication ports; they cannot cause deadlocks and are only relevant in this discussion for the timing information they represent.

Figure 7:
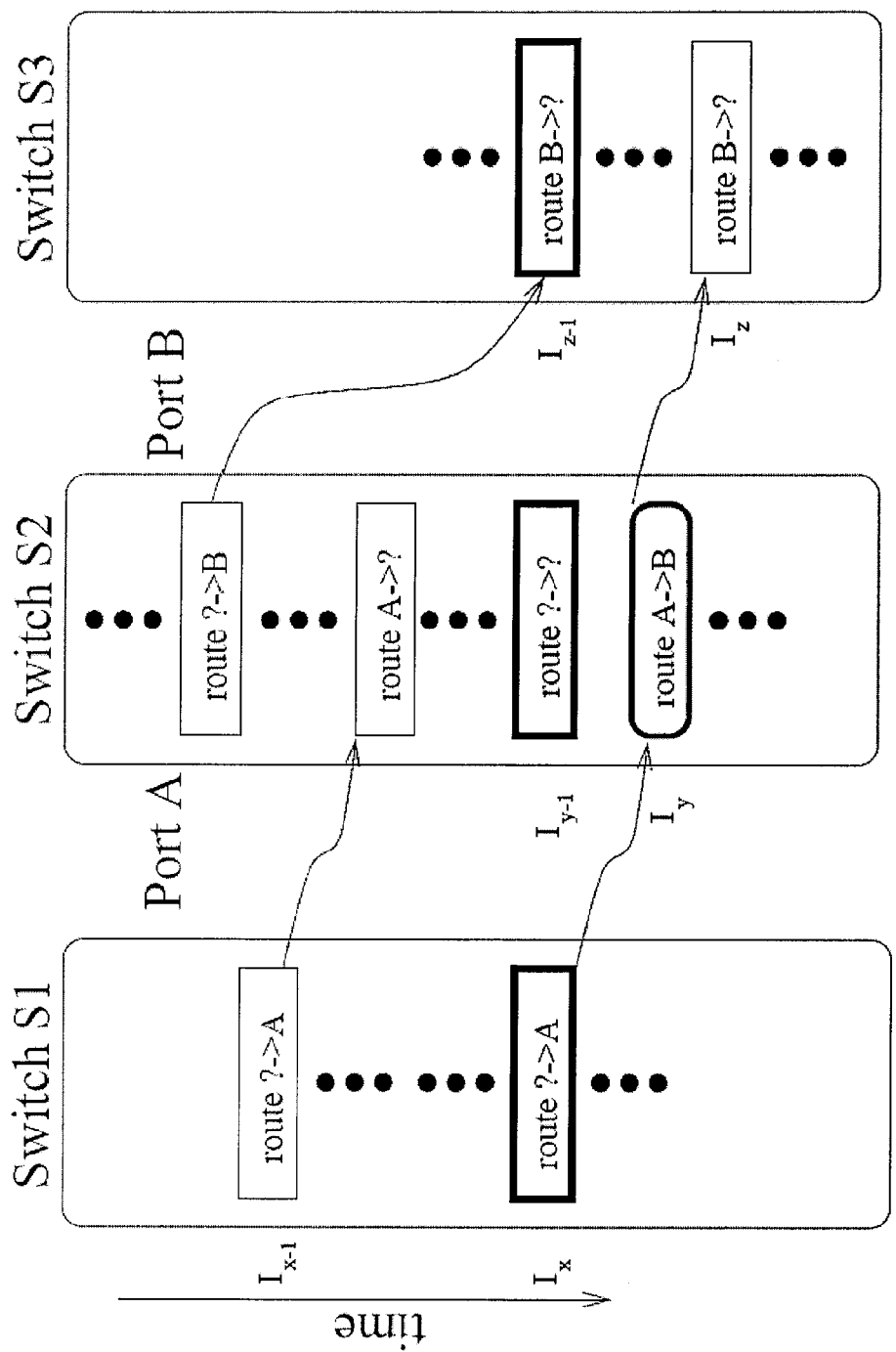
FIG. 7 is a diagram illustrating a communication scenario.

Consider the generic scenario in FIG. 7. In the figure, each large long rectangle represents an execution node (which are all switches in the figure, but a node may also be a processor), and each wide rectangle represents a communication instruction. There are three switches: S1, S2, and S3. Port A connects Switch S1 to Switch S2, while Port B connects Switch S2 to Switch S3. Spaces between execution nodes are ports. Edges represent flow of data. A communication instruction is of the form Route X→Y, where X is the source port and Y is the destination port. Since we only care about Port A and Port B in this example, other ports are labeled with "?". The focal instruction is the thick rounded rectangle labeled $I_y$, which represents a generic communication instruction that executes on Switch S2 and sends a value from Port A to Port B. Its dependent instructions are in thick regular rectangles.

We now derive the conditions under which Instruction $I_y$ can execute. The conditions for its ability to execute are the following: its input value must have been sent, its switch S2 must be ready to execute it, and the destination of its value (Port B) must be available. (In general, the three resources need not all be applicable. A send by a processor only requires an output port and the execution node, while a receive by a processor only requires the input value and the node.) These conditions can also be represented by execution of a set of instructions. In this example, ports are dedicated connections between two fixed nodes, so that each port has exactly one reader node and one writer node. Let $I_y$ be the $x^{th}$ instruction that reads from port A, the $y^{th}$ instruction that executes on its node N, and the $z^{th}$ instruction that writes to port B. Then before $I_y$ can execute, the following instructions must have executed:

1. the $x^{th}$ instruction that writes port A;
2. the y−$1^{th}$ instruction that executes on switch S2;
3. the z−$1^{th}$ instruction that reads (and flushes) port B.

Next, we argue that these conditions are also sufficient for $I_y$ to execute. The key observation is that once a resource becomes available for instruction $I_y$, it will remain available until the instruction has executed. The value on the input port cannot disappear; the execution node cannot skip over $I_y$ to run other instructions; the output port cannot be full after the previous value has been flushed. The reservation of the resources is based on three properties: the single-reader/single-writer property of the ports, the blocking semantics of the communication instructions, and the in-order execution of instructions.

Therefore, a communication instruction can execute whenever its dependent instructions, defined by the enumeration above, have executed.

Now, consider the schedule that is deadlock-free for one known set of timings. Plot the execution trace for this set of timings in a two dimensional grid, with node-id on the x-axis and time on the y-axis. Each slot in the execution trace contains the instruction (if any) that is executed for the specified node at the specified time. The plot is similar to FIG. 7, except that real execution times, rather than the static schedule orders, are used to place the instructions temporally.

Finally, consider a different set of timings for the same schedule. Let $t_{new}$ be a point in time for the new timings when the schedule has not been completed, and let $E_{new}(t_{new})$ be the set of instructions that have executed before time $t_{new}$. We use the above deadlock-free execution trace to find a runnable instruction at time $t_{new}$. Find the smallest time t in the deadlock-free execution trace that contains an instruction not in $E_{new}(t_{new})$. Call the instruction c. The dependent instructions of c must necessarily be contained in $E_{new}(t_{new})$. This statement derives from two facts:

1. All dependent instructions of c must execute before c in the deadlock-free execution trace.
2. Since c executes at time t and all instructions executed before time t are in $E_{new}(t_{new})$, all instructions executed before c in the deadlock-free execution trace are in $E_{new}(t_{new})$.

Therefore, c must be be runnable at time $t_{new}$ for the new set of timings.

Having found a runnable instruction for any point in time when the schedule is not completed, the schedule must always make progress, and it will not deadlock.

The second correctness condition, that a deadlock-free schedule generates the same results under two different sets of timings, is relatively easy to demonstrate. Changes in timings do not affect the order in which instructions are executed on the same node, nor do they change the order in which values are injected or consumed at individual ports. The blocking semantics of communication instructions ensures that no instruction dependence can be violated due to a timing skew between the sender and the receiver. Therefore, the values produced by two different timings must be the same.

1.3 Control Orchestration

CC-DILP provides two-tiered support for branches in a program: global branches and local branches. A global branch is a branch that involves a global transfer of control across the cores. A local branch is a branch that is executed independently on only one or a few cores. CC-DILP's employs this two-tiered support in order to provide both generality and performance. Branches between scheduling regions use the generality of global coordination, but branches within a scheduling region only need to be executed independently on one or a few cores. Furthermore, local branches allow CC-DILP to operate on scheduling regions that encompass multiple basic blocks, which in turn increases the scope within which CC-DILP can schedule parallelism.

This section describes an example of control orchestration in CC-DILP, which includes three parts. Control selection decides whether each branch in the program is a local branch or a global branch. Asynchronous global branching is the software mechanism for global branches. Control localization is the collection of software techniques to support efficient execution of local branches.

1. Control Selection:

Control selection decides whether each branch in the program is a local branch or a global branch. It is the indirect byproduct of region identification. During region identification, a procedure is divided into multiple scheduling regions. This process also divides branches into two types: internal branches and external branches. An internal branch is a forward branch whose target is in the same scheduling region. These branches are temporarily replaced by predicated code, and they either turn into whatever means the architecture has for predicated execution (e.g., predicated instructions, conditional moves, or selects), or they eventually become local branches. An external branch is either a backward branch, or a forward branch whose target is in a different scheduling region. These type of branches become global branches.

2. Asynchronous Global Branching:

CC-DILP implements global branching asynchronously in software by using the SON and local branches. First, the value of the branch condition (or "branch value") is broadcast to all the cores through the SON. This communication is exported and scheduled explicitly by the compiler just like any other communication. Therefore, it can overlap with other computation in the basic block. Then, each core and switch individually performs a branch without synchronization at the end of the execution of a scheduling region. Correct execution is ensured despite the introduction of this asynchrony because of the static ordering property.

The overhead of asynchronous global branching is explicit in the broadcasting of the branch condition. This overhead contrasts with the implicit overhead of global wiring incurred by global branching in VLIWs and superscalars. Making the overhead explicit has the following advantages. First, the compiler can hide the overhead by overlapping it with useful work. Second, this branching model does not require dedicated wires used only for branching. Third, the approach allows the global coordination to be performed without any global wires, which inhibit scalability.

3. Control Localization:

Control localization is the application of a collection of software techniques to support efficient execution of local branches. It is designed to achieve two goals. The first goal is flexibility during instruction assignment. During instruction assignment, CC-DILP uses a predicated code representation and treats each instruction as an individual unit, so that instructions with the same control dependences can freely be mapped onto different cores. This representation has two advantages. First, it allows the compiler to exploit the parallelism available among predicated instructions. Second, it naturally supports multiple loads/stores that have the same control dependences but are static memory references on different cores. The actual assignment of branches to cores mirrors that of instruction management, and it is supported by the same partitioning and assignment phases as shown in FIG. 4.

The second goal of control localization is to reduce the number of local branches that have to execute once individual predicated instructions have been assigned to cores. For example, CC-DILP determines whether to use local branches based on determining a cost of executing predicated instructions. A factor that can contribute to this cost includes the level of support for executing predicated instructions. Full predication support (e.g., using predicate registers) is cheapest and would favor more predicated instructions. Partial predication support (e.g., using conditional move instructions or select instructions) would favor more local branches. Another factor includes the ability to completely eliminate a local branch and its associated branch misprediction cost. Another factor includes number of time slots in a schedule of functional units in a core for executing a predicated instruction.

In one exemplary procedure for determining when to convert predicated code to unpredicated code dependent on a local branch, priority is given to instructions that are already unpredicated since they are not dependent on a predicate or branch condition and will definitely be executed. Then for any remaining open schedule slots, the compiler fills the slots with predicated instructions. Then any predicated instructions left over that don't fit into the existing schedule are converted back to unpredicated instructions, and a new schedule is generated.

CC-DILP converts post-assignment predicated code back to branch code in a process called reverse if-conversion, which is described in more detail in "A Framework for Balancing Control Flow and Predication," (appearing in 1997 *MICRO*), incorporated herein by reference.

For example, this cited paper describes predicated representation as a compiler N-address program representation in which each instruction is guarded by a boolean source operand whose value determines whether the instruction is executed or nullified. This guarding boolean source operand is referred to as the predicate. The values of predicate registers can be manipulated by a predetermined set of predicate defining instructions. The use of predicates to guard instruction execution can reduce or even completely eliminate the need for branch control dependences. When all instructions that are control dependent on a branch are predicated using the same condition as the branch, that branch can legally be removed. The process of replacing branches with appropriate predicate computations and guards is known as if-conversion. The cited paper describes "partial reverse if-conversion" as the application of reverse if-conversion to a particular predicate in a hyperblock for a chosen set of instructions. Reverse if-conversion is the inverse process to if-conversion. Branching code that contains no predicates is generated from a block of predicated code. This allows code to be compiled using a predicate representation, but executed on a processor without support for predicated execution.

During scheduling, code control-dependent on the same branch is treated as a single unit. This conversion reduces the number of local branches in two ways. First, instructions that share the same predicate can amortize the cost of executing the local branch. Second, instructions with complementary predicates can also share the same local branch.

The ability to assign local branches to a subset of cores is useful for efficiently coordinating final assignments of instructions to cores. For example, the following portion of a program including an if statement can be scheduled as described below.

A;
if ( ... )
B;
else
C;
D;

This hypothetical portion of code includes four basic blocks of work A, B, C, and D, which may each correspond to multiple instructions. The following is a hypothetical mapping of the blocks to four cores labeled 0-3. Each row of assigned blocks of work represents a successive unit of time (e.g., a cycle).

| Cores: | | | |
| --- | --- | --- | --- |
| 0 | 1 | 2 | 3 |
| A | A | A | A |
| A | A/B | A | |
| B/C | B/C | D | D |
| B/C | B/C | D | D |
| D | D | D | D |

In the example, B block of instructions have been partially predicated so that part of it can be executed concurrently with the A block. The work for B/C have been assigned to two cores and executed using branches instead predicated execution such that only one of B or C is executed depending on the branch condition. The number of cores used for B/C is selected to match the amount of available parallelism in those blocks. Braches are used here instead of predicated execution because no time is wasted on instructions that may not be needed. While two cores are executing B or C, two other tiles are independently doing work on D.

2 Memory Distribution

This section describes examples of how data memory is distributed for ILP on a multicore. It first describes distribution for a machine without cache coherence. Both standalone programs and programs that may interact with other programs are considered. Then, the implication of cache coherence is considered.

2.1 Framework

The basic approach in this example is to distribute data memory across cores while at the same time avoiding the need for fine-grained coherence between cores, because in most cases their run-time cost is too high. This is true even if hardware cache coherence is available, because a word that needs to be accessed through cache coherence hardware will take much longer than a word in the local cache.

This program model allows for the possibility that an ILP program may be part of a larger application consisting of multiple programs which may interact with each other through message passing or shared memory. We assume that logically, an ILP program lives in a single address space, even though it is being executed across multiple cores. Thus, each core has access to the entire address space. But as explained below, for coherence reasons the compiler may impose restrictions on which core will access what data.

The framework for this example is as follows.

For the purpose of memory analysis, the code of a single ILP program is statically divided into memory analysis regions. Each memory analysis region is a connected subgraph of a program's static call and control flow graph, such that all memory analysis regions form a partition of the entire call/control flow graph.

It is worthwhile to note the relations between a memory analysis region and the scheduling regions described in Section 1.1. A memory analysis region includes one or more scheduling regions; each scheduling region is fully contained in exactly one memory analysis region. Note that a scheduling region contains forward control flow, while a memory analysis region may contain loops as well as full procedures.

Memory analysis is performed on each memory analysis region individually. The aim of the memory analysis is to partition static memory references into equivalence classes. The analysis ensures that each equivalence class of accesses is guaranteed not to access the same memory as accesses from a different equivalence class. Once these equivalence classes are identified, they are distributed across cores. This distribution avoids true coherence issues because a data item is guaranteed to be accessed by at most one core.

The techniques used to identify equivalence classes are described below.

For architectures without cache coherence, the compiler inserts initialization and finalization codes that are executed on entry and exit of each memory analysis region. These codes are used to perform copy-in and copy-out of data structures that are distributed across tiles in that scheduling region. The copy-in/copy-out gives the compiler better control of the layout of the data structures to be operated on. First, the copying allows the compiler to ensure that data in different equivalence classes do not map to the same cache line and suffer from false sharing (e.g., when a given cache line has a first portion modified by one core and a second core, leading to two "dirty" copies of the cache line with neither copy accurately reflecting the latest modifications to both portions). We call this cache line aliasing the multiple data copy problem, or the MDC problem for short. Second, the copying allows the compiler to reshape arrays to the benefit of the accesses in that region. Third, it avoids the need to flush the entire cache to maintain coherence when transitioning between scheduling regions.

In addition, the finalization code also synchronizes the instruction streams of all the cores as part of the coherence protocol. On the tiled processor architecture, this can be provided by a barrier operation on the static network, which can be implemented at very low cost.

2.2 Standalone Programs without Cache Coherence

If the input program is standalone and has full control of its memory, the compiler can perform global analysis on its memory accesses to divide memory accesses (e.g., read or write instructions) and objects (e.g., variables accessed by read or write instructions) into equivalence classes. The equivalence classes are over the space of "accesses" (instructions that access memory objects) as well as the memory objects that the instructions potentially point to. They are derived to have the following properties: (1) all accesses within an equivalence class only access objects in the same equivalence class; (2) all objects within an equivalence class are only accessed by objects in the same class.

Once the equivalence classes are identified, the compiler can assign the memory accesses of different equivalence classes to different cores, so long as the compiler ensures that accesses in the same equivalence class are mapped to the same core. To completely avoid coherence issues, the compiler also ensures that objects in different equivalence classes don't share the same cache line.

Equivalence classes can be determined using any of a variety of techniques, including one of the following two techniques. In equivalence class unification, the compiler first performs pointer analysis on the input program and constructs a memory access graph. In a memory access graph, nodes represent either objects or memory accesses. An edge is always between a memory access and an object, and it means that the memory access may access the object. A standard union-find algorithm can be applied to this graph to identify the equivalence classes of the program.

In modulo unrolling and congruence analysis, individual arrays are each further subdivided into sub-arrays. An array A is subdivided into N sub-arrays, where N is the number of cores to be distributed across. Each sub-array $A_i$ contains the portion of array that contains the elements with indices of the form i % N. The sub-arrays are then distributed across the cores. The compiler then performs unrolling and congruence analysis to determine which of those sub-arrays accesses in loops are mapped to.

Note that one trivial set of equivalence classes is to map all objects and non-spill memory accesses to a single class. Then only one core performs all such accesses. In the absence of compiler analysis, this is a conservative and legitimate approach.

2.3 Non-Standalone Programs without Cache Coherence

As programs get larger, it becomes increasingly difficult to find applicable equivalence classes for the duration of the program. Furthermore, an application on a multicore processor may contain multiple distinct programs that communicate via shared memory. When this happens, the compiler cannot freely make global decisions about memory assignments on one of those programs.

To extend the equivalence class approach to handle these cases, a program is divided into regions. For regions that are performance critical (e.g., inner loops), the compiler relies on the restrict keyword for alias analysis. Furthermore, it uses copy-in/copy-out semantics on arrays as well as other objects that can benefit from distribution. This means that those objects are copied into private memory before the critical regions, and copied out from private memory after the critical regions. The copying can at the same time distribute the objects in a way that best suits the region. At region boundaries, either data caches are flushed or data is copied out explicitly to maintain coherence.

2.4 With Cache Coherence

The equivalence-class scheme is equally applicable to a memory system with cache coherence. As explained earlier, even with cache coherence it is desirable to know at compile time where the memory accessed by a memory reference resides, both to avoid the run-time cost of coherence, and to allow the compiler to optimize for computation locality.

Cache coherence provides two potential benefits to the equivalence-class scheme. First, it obviates some need for copy-in/copy-out; memory accesses can simply be assigned to the desired core and the distribution will occur naturally. (Within a memory analysis region, however, correct ordering of potentially aliasing memory operations are still maintained, both within a core and across cores.) However, for arrays that have been split into sub-arrays, the sub-arrays still need to be remapped to different cache lines and thus copying is still used. Second, cache coherence solves the multiple data copy problem without needing copy-in/copy-out. Third, cache coherence potentially allows equivalence classes to be more loosely defined, where a few memory accesses with poor aliasing behavior are allowed to access memory in more than one equivalence classes. Though cache coherence does not eliminate the need for some synchronization, it lowers the cost of handling such accesses and allows more such cases to be profitable overall.

It is to be understood that the foregoing description is intended to illustrate and not to limit the scope of the invention, which is defined by the scope of the appended claims. Other embodiments are within the scope of the following claims.

What is claimed is:

1. A method for configuring a system comprising a plurality of computation units interconnected by an interconnection network, the method comprising:

forming by a computing system subsets of instructions corresponding to different portions of a program, the subsets of instructions being related according to a control flow graph;

scheduling a value of an associated branch condition to be broadcast to multiple computation units for each of a first subset of branches in the control flow graph;

representing each instruction dependent on an associated branch condition as a predicated instruction that includes a predicate for computing the associated branch condition for each of a second subset of branches in the control flow graph;

assigning each subset of instructions to one of the computation units for execution on the assigned computation unit; and converting at least some of the predicated instructions in a subset of instructions assigned to a given computation unit into unpredicated instructions that depend on a branch local to the given computation unit.

2. The method of claim 1, wherein converting at least some of the predicated instructions in the subset of instructions assigned to the given computation unit into unpredicated instructions is based on determining a cost of executing predicated instructions.

3. The method of claim 1, wherein converting at least some of the predicated instructions in the subset of instructions assigned to the given computation unit into unpredicated instructions is based on determining that the given computation unit does not support predicated execution.

4. The method of claim 1, wherein at least some of the predicated instructions in the subset of instructions assigned to the given computation unit are scheduled as predicated instructions based on determining that the given computation unit supports predicated execution.

5. The method of claim 4, wherein at least some of the predicated instructions are scheduled as predicated instructions further based on whether time slots in a schedule are available for executing the predicated instructions.

6. The method of claim 4, wherein the given computation unit supports predicated execution using a predicate register that stores a predicate associated with a predicated instruction.

7. The method of claim 4, wherein the given computation unit supports predicated execution using conditional move instructions.

8. The method of claim 4, wherein the given computation unit supports predicated execution using select instructions.

9. The method of claim 1, wherein the predicated instructions converted to the unpredicated instructions are associated with the same predicate, and a branch condition for the branch local to the given computation unit is derived from the predicate.

10. The method of claim 1, wherein at least some of the predicated instructions converted to the unpredicated instructions are associated with complementary predicates, and a branch condition for the branch local to the given computation unit is derived from the one of the complementary predicates.

11. The method of claim 1, wherein the control flow graph representations of the subsets of instructions have a single entry flow of control and a single exit flow of control.

12. The method of claim 11, wherein all internal control flow edges of the control flow graph representations of the subsets of instructions are forward edges.

13. The method of claim 1, wherein each branch in the first subset of branches comprises a backward branch or a forward branch in a given subset of instructions whose target is in a different subset of instructions.

14. The method of claim 1, wherein each branch in the second subset of branches comprises a forward branch in a given subset of instructions whose target is in the given subset of instructions.

15. The method of claim 1, further comprising forming a specification of the program to be executed by the plurality of computation units based on the assigned subsets of instructions.

16. A computer program product tangibly embodied on a computer-readable storage device, for configuring a system comprising a plurality of computation units interconnected by an interconnection network, the computer program comprising instructions for causing a computer system to:
    form subsets of instructions of a software program corresponding to different portions of the software program, the subsets of instructions being related according to a control flow graph by instructions to:
    schedule a value of an associated branch condition to be broadcast to multiple computation units for each of a first subset of branches in the control flow graph;
    represent each instruction dependent on an associated branch condition as a predicated instruction that includes a predicate for computing the associated branch condition for each of a second subset of branches in the control flow graph;
    assign each subset of instructions of the software program to one of the computation units for execution on the assigned computation unit; and
    convert at least some of the predicated instructions in a subset of instructions of the software program assigned to a given computation unit into unpredicated instructions that depend on a branch local to the given computation unit.

17. The computer program product of claim 16 wherein instructions to convert at least some of the predicated instructions in the subset of instructions assigned to the given computation unit into unpredicated instructions, convert based on a determination of a cost of executing predicated instructions.

18. The computer program product of claim 16 wherein instructions to convert at least some of the predicated instructions scheduled as predicated instructions, further comprise instructions to determine whether time slots in a schedule are available for executing the predicated instructions.

19. The computer program product of claim 16 wherein the given computation unit supports predicated execution using a predicate register that stores a predicate associated with a predicated instruction.

20. The computer program product of claim 16 wherein the given computation unit supports predicated execution using conditional move instructions.

21. The computer program product of claim 16 wherein the given computation unit supports predicated execution using select instructions.

22. The computer program product of claim 16 wherein the control flow graph representations of the subsets of instructions have a single entry flow of control and a single exit flow of control.

23. The computer program product of claim 22 wherein all internal control flow edges of the control flow graph representations of the subsets of instructions are forward edges.

24. A system, comprising:
    one or more computation devices, the one or more computation devices configured to:
    form subsets of instructions corresponding to different portions of a software program, the subsets of instructions being related according to a control flow graph; the system configured to:
    schedule a value of an associated branch condition to be broadcast to multiple computation units for each of a first subset of branches in the control flow graph;
    represent each instruction dependent on an associated branch condition as a predicated instruction that includes a predicate for computing the associated branch condition for each of a second subset of branches in the control flow graph;
    assign each subset of instructions to one of the computation units for execution on the assigned computation unit; and
    convert at least some of the predicated instructions in a subset of instructions assigned to a given computation unit into unpredicated instructions that depend on a branch local to the given computation unit with devices configured to convert based on whether a target architecture supports predication execution.

25. The system of claim 24, further comprising a memory for storing the information for configuring the computation units.

26. The system of claim 24, wherein each computation unit comprises
    a processor, and
    a switch including switching circuitry to forward data received over data paths from other computation units to the processor and to switches of other computation units, and to forward data received from the processor to switches of other computation units.

27. The system of claim 24 wherein to convert at least some of the predicated instructions in the subset of instructions assigned to the given computation unit into unpredicated instructions, the system is further configured to convert based on a determination of a cost of executing predicated instructions.

28. The system of claim 24 wherein to convert at least some of the predicated instructions are scheduled as predicated instructions the system is further configured to determine whether time slots in a schedule are available for executing the predicated instructions.

29. The system of claim 24 wherein the given computation unit supports predicated execution uses a predicate register that stores a predicate associated with a predicated instruction.

30. The system of claim 24 wherein the given computation unit supports predicated execution using conditional move instructions.

31. The system of claim 24 wherein the given computation unit supports predicated execution using select instructions.

32. The system of claim 24 wherein control flow graph representations of the subsets of instructions have a single entry flow of control and a single exit flow of control.

33. The system of claim 32 wherein internal control flow edges of the control flow graph representations of the subsets of instructions are forward edges.

34. A computer program product tangibly embodied on a computer-readable storage device, for configuring a system comprising a plurality of computation units interconnected by an interconnection network, the computer program comprising instructions for causing a computer system to:
- form subsets of instructions of a software program corresponding to different portions of the software program, the subsets of instructions being related according to a control flow graph by instructions to:
- schedule a value of an associated branch condition to be broadcast to multiple computation units for each of a first subset of branches in the control flow graph;
- represent each instruction dependent on an associated branch condition as a predicated instruction that includes a predicate for computing the associated branch condition for each of a second subset of branches in the control flow graph;
- determine whether the computation units support predicated execution;
- convert at least some of the predicated instructions in a subset of instructions of the software program assigned to a given computation unit into unpredicated instructions that depend on a branch local to the given computation unit when predicated execution is supported by the computation units;
- assign each subset of instructions of the software program to one of the computation units for execution on the assigned computation unit; and when the computation units do not support predicated execution;
- convert at least some predicated instructions in the assigned subset of instructions of the software program assigned to a given computation unit, into unpredicated instructions after each subset of instructions is assigned.

* * * * *